US012613398B2

(12) United States Patent (10) Patent No.: US 12,613,398 B2

Ogawa (45) Date of Patent: Apr. 28, 2026

(54) ZOOM LENS, IMAGE PICKUP APPARATUS, AND IMAGE PICKUP SYSTEM

(71) Applicant: CANON KABUSHIKI KAISHA, Tokyo (JP)

(72) Inventor: Naotoshi Ogawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 18/530,290

(22) Filed: Dec. 6, 2023

(65) Prior Publication Data

US 2024/0219695 A1 Jul. 4, 2024

(30) Foreign Application Priority Data

Dec. 23, 2022 (JP) .................................. 2022-206936

(51) Int. Cl.
*G02B 15/14* (2006.01)

(52) U.S. Cl.
CPC .................................. *G02B 15/1431* (2019.08)

(58) Field of Classification Search
CPC .......................... G02B 15/1431; G02B 15/1461
See application file for complete search history.

(56) References Cited

U.S. PATENT DOCUMENTS

| | | | |
|---|---|---|---|
| 10,295,806 B2 | 5/2019 | Ogawa | |
| 10,955,647 B2 | 3/2021 | Ogawa | |
| 11,137,586 B2 | 10/2021 | Ogawa | |
| 11,143,850 B2 | 10/2021 | Ogawa | |
| 11,187,876 B2 | 11/2021 | Ogawa | |
| 11,187,878 B2 | 11/2021 | Ogawa | |
| 11,347,034 B2 | 5/2022 | Ogawa | |
| 2013/0258130 A1* | 10/2013 | Mihara | .............. G02B 15/1461 |
| | | | 348/222.1 |
| 2022/0390726 A1* | 12/2022 | Tanaka | ............... G02B 15/1431 |

FOREIGN PATENT DOCUMENTS

JP 2007-139858 A 6/2007

* cited by examiner

*Primary Examiner* — James A Dudek

(74) *Attorney, Agent, or Firm* — Carter, DeLuca & Farrell LLP

(57) ABSTRACT

A zoom lens includes a plurality of lens units, which consist of, in order from an object side to an image side, a first lens unit having positive refractive power, an intermediate group including a plurality of lens units, and a rear lens unit. A distance between adjacent lens units changes during zooming from a wide-angle end to a telephoto end. The first lens unit is fixed relative to an image plane for zooming from the wide-angle end to the telephoto end. The first lens unit consists of a plurality of subunits in which a distance between adjacent subunits changes during focusing, and the plurality of subunits include, in order from the object side to the image side, a first subunit that does not move for focusing, a second subunit having positive refractive power that moves for focusing, and a third subunit having negative refractive power. A predetermined inequality is satisfied.

18 Claims, 13 Drawing Sheets

ZOOM LENS, IMAGE PICKUP APPARATUS, AND IMAGE PICKUP SYSTEM

BACKGROUND

Technical Field

One of the aspects of the embodiments relates to generally to a zoom lens, and more particularly to a zoom lens suitable for an image pickup apparatus, such as a digital still camera, a digital video camera, a broadcasting camera, a surveillance camera, an on-board camera (in-vehicle camera), a film-based camera, and the like.

Description of Related Art

An imaging optical system for an image pickup apparatus has recently been demanded to have a zoom lens with a high zoom ratio and entirely compact size. For example, in imaging sports broadcasts, nature programs, etc., objects are often imaged from a long distance, and a telephoto zoom lens may have a high zoom ratio and a long focal length at the telephoto end. In addition, along with the increase in the number of pixels in image sensors, telephoto zoom lenses are demanded to have higher performance, especially high optical performance in the entire zoom range and in the entire focus range. Since the zoom lens is used in an imaging mode that emphasizes mobility and operability, the zoom lens commonly includes a first lens unit having positive refractive power that is used for focusing and disposed closest to the object.

Japanese Patent Laid-Open No. 2007-139858 discloses a zoom lens that includes a first lens unit including, in order from the object side, a positive 1a subunit, a positive 1b subunit, and a negative 1c subunit, wherein the positive 1b subunit moves during focusing from infinity to the short (or close) distance.

Image pickup apparatuses, such as television cameras and movie cameras, have recently demanded to have a remote control ability, and thus the zoom lens is demanded to have a small size, reduced weight, and lightweight driving unit. Particularly in zoom lenses for television cameras and movie cameras, a focus driving unit, which is usually heavy, is demanded to be lightweight.

SUMMARY

A zoom lens according to one aspect of the embodiment includes a plurality of lens units. The plurality of lens units consisting of, in order from an object side to an image side, a first lens unit having positive refractive power, an intermediate group including a plurality of lens units, and a rear lens unit. A distance between adjacent lens units changes during zooming from a wide-angle end to a telephoto end. The first lens unit is fixed relative to an image plane for zooming from the wide-angle end to the telephoto end. The first lens unit consists of a plurality of subunits in which a distance between adjacent subunits changes during focusing, and the plurality of subunits include, in order from the object side to the image side, a first subunit that does not move for focusing, a second subunit having positive refractive power that moves for focusing, and a third subunit having negative refractive power. The following inequalities are satisfied:

$$0.10 < (f1 + Ok1)/f1 < 0.80$$

$$1.00 < f1/f1b < 2.00$$

where f1 is a focal length of the first lens unit in an in-focus state at infinity, Ok1 is a distance on an optical axis from a lens surface closest to an object of the first lens unit to an image-side principal point of the first lens unit in the in-focus state at infinity, and f1b is a focal length of the second subunit. An image pickup apparatus and an image pickup system each including the above zoom lens constitute another aspect of the embodiment.

Further features of the disclosure will become apparent from the following description of embodiments with reference to the attached drawings.

DESCRIPTION OF THE EMBODIMENTS

Figure 1:
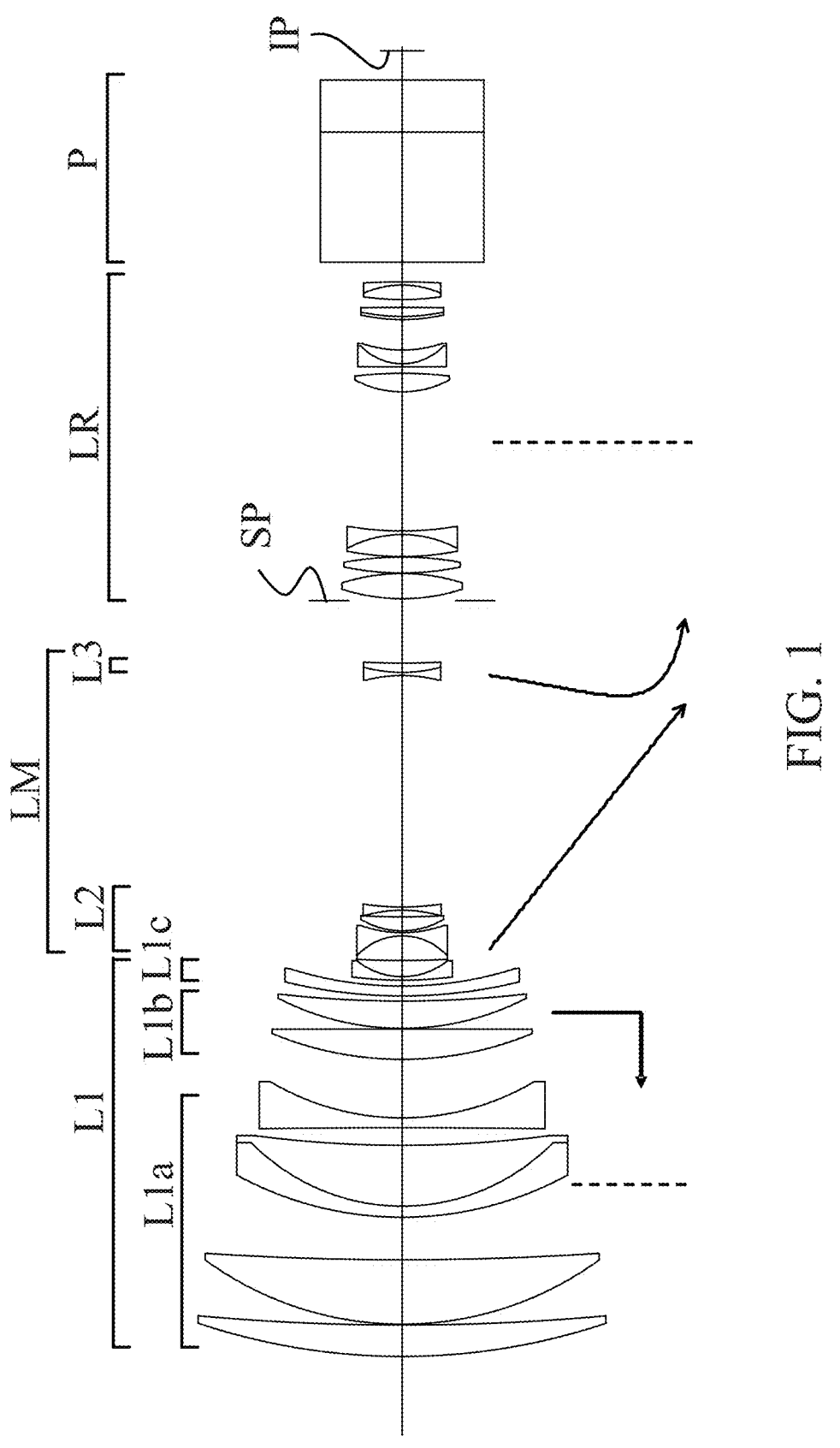
FIG. 1 is a lens sectional view of a zoom lens according to Example 1 in an in-focus state at infinity at a wide-angle end.
Figures 2A, 2B:
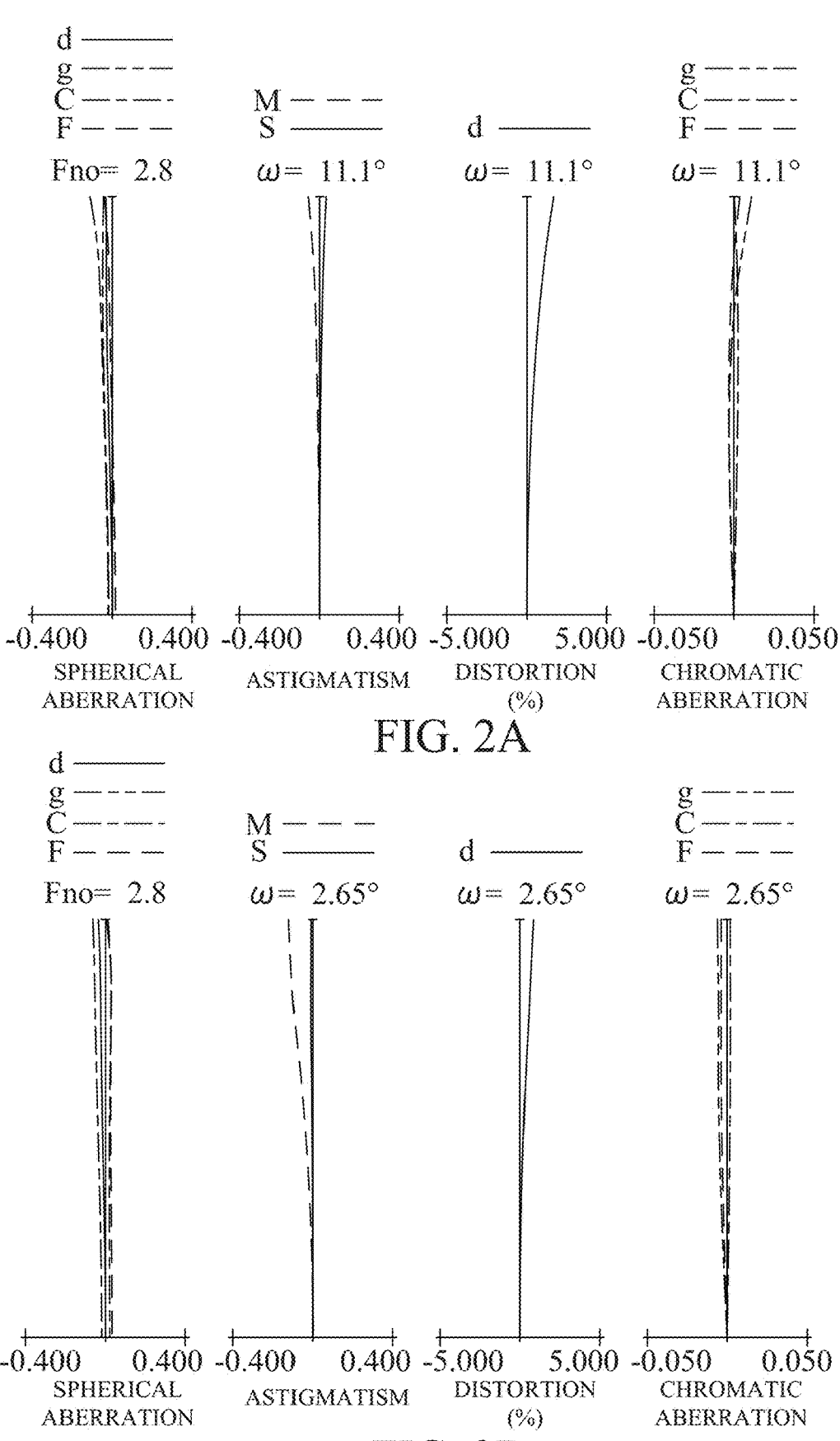
FIGS. 2A, 2B, and 2C are aberration diagrams of the zoom lens according to Example 1 in the in-focus state at infinity at the wide-angle end (WIDE), an intermediate zoom position (MIDDLE), and a telephoto end (TELE), respectively.
Figure 2C:
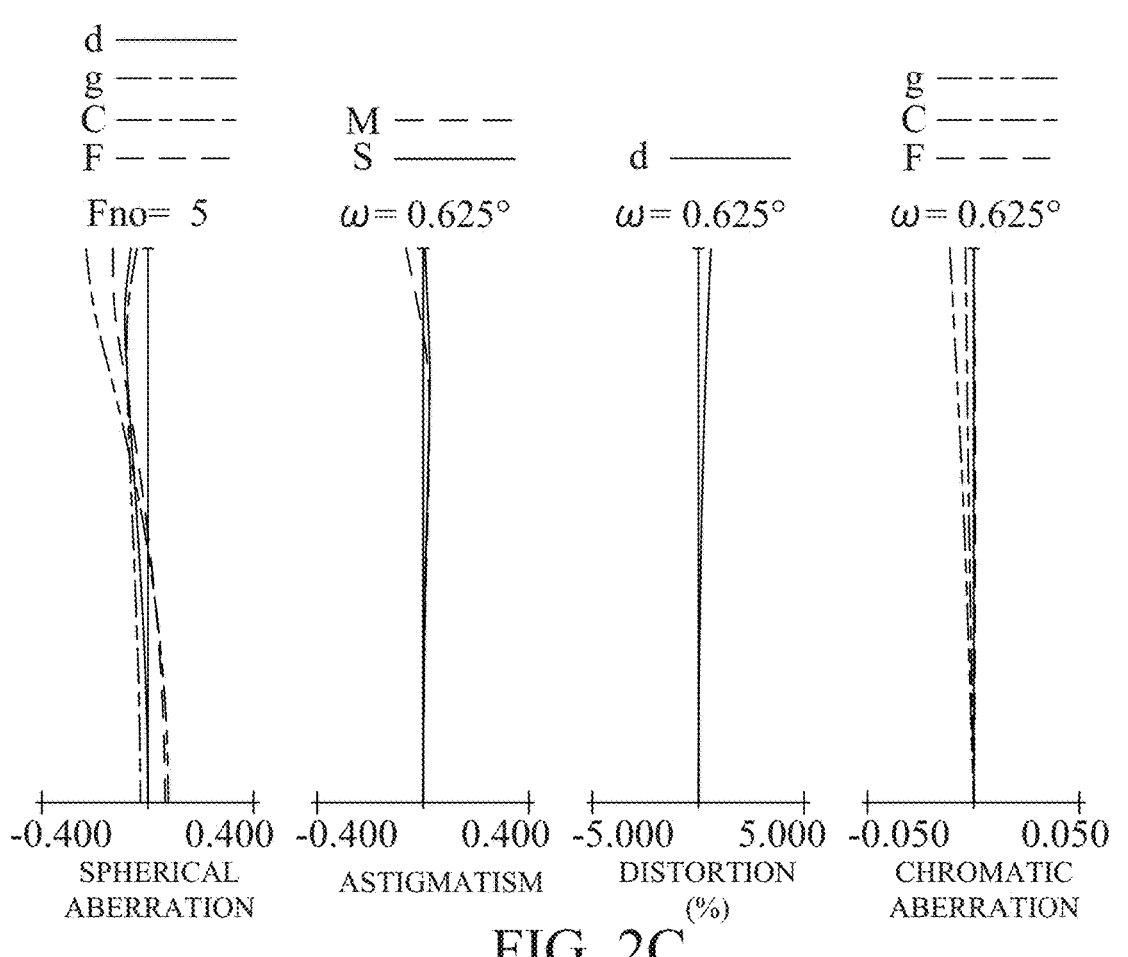

Referring now to the accompanying drawings, a description will be given of a zoom lens, an image pickup apparatus, and an image pickup system according to the disclosure. Basically (unless otherwise specified), corresponding elements in respective figures will be designated by the same reference numerals, and a duplicate description thereof will be omitted.

FIGS. 1, 3, 5, 7, 9, and 11 are lens sectional views of zoom lenses according to Examples 1 to 6, respectively, in in-focus states at infinity at a wide-angle end. The zoom lens according to each example is a zoom lens for an image pickup apparatus such as a digital still camera, a film-based camera, a digital video camera, a surveillance camera, a broadcasting camera, and an on-board camera.

In each lens sectional view, a left side is an object side (front) and a right side is an image side (back). The zoom lens according to each example includes a plurality of lens units. In this specification, a lens unit is a group of lenses that move or stand still during zooming. That is, in the zoom lens according to each example, a distance between adjacent lens units changes during zooming from the wide-angle end to the telephoto end. The lens unit may include one or more lenses. The lens unit may include an aperture stop.

In each lens sectional view, Li represents an i-th (where i is a natural number) lens unit counted from the object side in the zoom lens. LR represents a lens unit disposed closest to the image plane among the lens units in the zoom lens. LM represents an intermediate unit including a plurality of lens units.

SP denotes the aperture stop. The aperture stop SP determines (limits) a light beam of the maximum aperture F-number (Fno). IP denotes an image plane, and in a case where the zoom lens according to each example is used as an imaging optical system of a digital still camera or video camera, the imaging plane of a solid-state image sensor (photoelectric conversion element) such as a CCD sensor or CMOS sensor is disposed on the image plane IP. In a case where the zoom lens according to each example is used as an imaging optical system of a film-based camera, a photosensitive plane corresponding to the film plane is placed on the image plane IP. P represents a glass block, such as a prism and a filter.

A solid arrow illustrated below each lens unit indicates a moving locus of each lens unit during zooming from the wide-angle end to the telephoto end. A vertical broken line below each lens unit indicates that each lens unit is fixed relative to the image plane during zooming from the wide-angle end to the telephoto end.

In each of the following examples, the wide-angle end and the telephoto end refer to zoom positions in a case where the lens unit for zooming is mechanically located at both ends of the movable range on the optical axis.

A thick arrow in the optical axis direction indicates a moving direction of the focus lens unit that moves during focusing from infinity to the close distance. A thick arrow below the 1c subunit L1c in FIG. 3 indicates a moving locus of the 1c subunit L1c that moves during focusing from infinity to the closest distance.

FIGS. 2A to 2C, 4A to 4C, 6A to 6C, 8A to 8C, 10A to 10C, and 12A to 12C illustrate zoom lenses according to Examples 1 to 6, respectively. FIGS. 2A, 4A, 6A, 8A, 10A, and 12A are aberration diagrams at the wide-angle ends, and FIGS. 2B, 4B, 6B, 8B, 10B, and 12B are aberration diagrams at the intermediate zoom positions. FIGS. 2C, 4C, 6C, 8C, 10C, and 12C are aberration diagrams at the telephoto ends.

In a spherical aberration diagram, Fno denotes an F-number. The spherical aberration diagram illustrates spherical aberration amounts for the d-line (wavelength of 587.6 nm), g-line (wavelength of 435.8 nm), C-line (wavelength of 656.3 nm) and F-line (wavelength of 486.1 nm). In an astigmatism diagram, S indicates an astigmatism amount on a sagittal image plane, and M indicates an astigmatism amount on a meridional image plane. A distortion diagram illustrates a distortion amount for the d-line. A (lateral) chromatic aberration diagram illustrates a (lateral) chromatic aberration amount for the g-line, C-line, and F-line. ω denotes a half angle of view (°) (angle of view in paraxial calculation) and indicates the angle of view according to a ray tracing value.

In the spherical aberration diagrams, the full scale of the horizontal axis is ±0.400 mm. In the astigmatism diagrams, the full scale of the horizontal axis is ±0.400 mm. In the distortion diagrams, the full scale of the horizontal axis is ±5.000%. In the chromatic aberration diagrams, the full scale of the horizontal axis is ±0.05 mm. However, in Examples 5 and 6, the full scale of the horizontal axis in the spherical aberration diagrams is ±0.800 mm. In the astigmatism diagram, the full scale of the horizontal axis is ±0.800 mm. In the distortion diagram, the full scale of the horizontal axis is ±5.000%. In the chromatic aberration diagram, the full scale of the horizontal axis is ±0.1 mm.

A description will now be given of the characteristic configuration of the zoom lens according to each example.

The zoom lens according to each example includes a plurality of lens units. The lens units consist of, in order from the object side to the image side, a first lens unit L1 having positive refractive power, an intermediate group LM including a plurality of lens units, and a rear lens unit LR. In the zoom lens according to each example, a distance between adjacent lens units changes during zooming from the wide-angle end to the telephoto end. The first lens unit L1 is fixed (does not move) relative to the image plane IP for zooming from the wide-angle end to the telephoto end.

The first lens unit L1 consists of a plurality of subunits in which a distance between adjacent subunits changes during focusing. The plurality of subunits include, in order from the object side to the image side, a 1a subunit (first subunit) L1a that does not move for focusing, and a 1b subunit (second subunit) L1b having positive refractive power that moves for focusing, and a 1c subunit (third subunit) L1c having negative refractive power.

The zoom lens according to each example satisfies the following inequalities (1) and (2):

$$0.10 < (f1 + Ok1)/f1 < 0.80 \tag{1}$$

$$1.00 < f1/f1b < 2.00 \tag{2}$$

where f1 is a focal length of the first lens unit L1 in an in-focus state at infinity, Ok1 is a distance on the optical axis from a lens surface closest to the object of the first lens unit L1 in the in-focus state at infinity to an image-side principal point of the first lens unit L1, f1b is a focal length of the 1b subunit, and the sign of the distance Ok1 is positive in the image side direction, In the zoom lens according to each example, the first lens unit L1 includes, in order from the object side to the image side, the 1a subunit L1a that is fixed during focusing, the 1b subunit L1b having positive refractive power that moves during focusing, and the 1c subunit L1c having negative refractive power. This configuration can prevent a moving amount of the 1b subunit L1b from increasing during focusing by increasing the refractive power of the 1b subunit L1b. The 1c subunit L1c having negative refractive power and disposed on the image side in the first lens unit L1 pushes the image-side principal point position of the first lens unit L1 toward the object side. Thereby, the zoom lens achieves a high zoom ratio, high optical performance, reduced size and weight, and a lightweight focus driving unit.

A description will now be given of the technical meanings of inequalities (1) and (2).

Inequalities (1) and (2) define conditions for obtaining a zoom lens that is beneficial in terms of the high zoom ratio, high optical performance, reduced size and weight, and lightweight focus driving unit. In a case where the value of (f1+Ok1)/f1 becomes higher than the upper limit of inequality (1), the image-side principal point position of the first lens unit L1 becomes excessively close to the image plane, the lateral magnification of the second lens unit L2 at the wide-angle end becomes excessively small, and a moving amount of the second lens unit L2 increases. Thereby, the zoom lens becomes excessively large. Alternatively, the focal length of the first lens unit L1 becomes shorter, and it becomes difficult to keep various aberrations within permissible ranges at the telephoto end. In a case where the value of (f1+Ok1)/f1 becomes lower than the lower limit of inequality (1), the image-side principal point position of the first lens unit L1 becomes excessively close to the object, and the entrance pupil position at the wide-angle end becomes excessively close to the image plane. Thereby, the first lens unit L1 becomes excessively large. Alternatively, the focal length of the first lens unit L1 becomes excessively long, the lateral magnification of the second lens unit L2 at the wide-angle end becomes excessively small, and the moving amount of the second lens unit L2 becomes large. Thereby, the zoom lens becomes excessively large.

In a case where the value of f1/f1b becomes higher than the upper limit of inequality (2), the refractive power of the 1b subunit L1b becomes excessively strong, and fluctuations in various aberrations during focusing become excessively large. In a case where the value of f1/f1b becomes lower than the lower limit of inequality (2), the refractive power of the 1b subunit L1b becomes excessively weak, a moving amount of the 1b subunit L1b during focusing becomes large, and the first lens unit L1 becomes excessively large.

Inequalities (1) and (2) may be replaced with inequalities (1a) and (2a) below:

$$0.30 < (f1 + Ok1)/f1 < 0.70 \tag{1a}$$

$$1.20 < f1/f1b < 1.90 \tag{2a}$$

Inequalities (1) and (2) may be replaced with inequalities (1b) and (2b) below:

$$0.40 < (f1 + Ok1)/f1 < 0.60 \tag{1b}$$

$$1.40 < f1/f1b < 1.90 \tag{2b}$$

As explained above, the zoom lens according to each example is configured to satisfy the above configuration and inequalities (1) and (2). Thereby, the zoom lens achieves the high zoom ratio, high optical performance, reduced size and weight, and lightweight focus driving unit.

A description will now be given of conditions that may be satisfied by the zoom lens according to each example. The zoom lens according to each example may satisfy at least one of the following inequalities (3) to (10).

That the zoom lens according to each example may satisfy the following inequality (3):

$$0.00 < |f1/f1a| < 0.30 \tag{3}$$

where f1a is the focal length of the 1a subunit L1a.

Inequality (3) defines a condition for obtaining a zoom lens that is beneficial in terms of the reduced size and weight, and high optical performance. In a case where the value of |f1/f1a| becomes higher than the upper limit of inequality (3), the moving amount of the 1b subunit L1b during focusing becomes large and the first lens unit L1 becomes excessively large. In a case where the value becomes lower than the lower limit of inequality (3), fluctuations in various aberrations during focusing at the telephoto end become excessively large.

The zoom lens according to each example may satisfy the following inequality (4):

$$-1.00 < f1/f1c < -0.10 \tag{4}$$

where f1c is a focal length of the 1c subunit L1c.

Inequality (4) defines a condition for obtaining a zoom lens that is beneficial in terms of the high zoom ratio, reduced size and weight, and reduced weight of the focus driving unit. In a case where the value of f1/f1c becomes higher than the upper limit of inequality (4), the refractive power of the 1c subunit L1c becomes weaker, and the image-side principal point position of the first lens unit L1 becomes excessively close to the image plane. Thus, the zoom lens becomes excessively large. In a case where the value of f1/f1c becomes lower than the lower limit of inequality (4), the refractive power of the 1c subunit L1c becomes strong, and the image-side principal point position of the first lens unit L1 becomes excessively close to the object, and the entrance pupil position at the wide-angle end becomes excessively close to the image plane. Thus, the first lens unit L1 becomes excessively large.

The zoom lens according to each example may satisfy the following inequality (5):

$$0.40 < L11/f1 < 0.90 \tag{5}$$

where L11 is a distance on the optical axis from a lens surface closest to the object of the first lens unit L1 to a lens surface closest to the image plane of the first lens unit L1 in the in-focus state at infinity.

Inequality (5) defines a condition for obtaining a zoom lens that is beneficial in terms of the reduced size and weight, and high optical performance. In a case where the value of L11/f1 becomes higher than the upper limit of inequality (5), the first lens unit L1 becomes thicker and the zoom lens becomes larger. In a case where the value of L11/f1 becomes lower than the lower limit of inequality (5), the first lens unit L1 becomes thinner and it becomes difficult to keep various aberrations within permissible ranges at the telephoto end.

The zoom lens according to each example may satisfy the following inequality (6):

$$0.20 < L1a/f1 < 0.70 \tag{6}$$

where L1a is a distance on the optical axis from a lens surface closest to the object of the 1a subunit L1a to a lens surface closest to the image plane of the 1a subunit L1a.

Inequality (6) defines a condition for obtaining a zoom lens that is beneficial in terms of the high zoom ratio, reduced size and weight, high optical performance, and reduced weight of the focus driving unit. In a case where the value of L1a/f1 becomes higher than the upper limit of inequality (6), the first lens unit L1 becomes thicker and the zoom lens becomes larger. In a case where the value of L1a/f1 becomes lower than the lower limit of inequality (6), the 1a subunit L1a becomes thinner, the image-side principal point of the first lens unit becomes excessively close to the image plane, and the 1b subunit L1b becomes larger. Alternatively, the focal length of the first lens unit becomes excessively small, and it becomes difficult to obtain a zoom lens with a high zoom ratio.

The zoom lens according to each example may satisfy the following inequality (7):

$$0.01 < L1ab/f1 < 0.20 \qquad (7)$$

where L1ab is a distance on the optical axis from a lens surface closest to the image plane of the 1a subunit L1a to a lens surface closest to the object of the 1b subunit Lib in an in-focus state at infinity.

Inequality (7) defines a condition for obtaining a zoom lens that is beneficial in terms of the reduced size and weight, the sufficient closest distance that is focusable, and high optical performance. In a case where the value of L1ab/f1 becomes higher than the upper limit of inequality (7), the first lens unit L1 becomes thicker and the zoom lens becomes larger. In a case where the value of L1ab/f1 becomes lower than the lower limit of inequality (7), the moving amount of the 1b subunit L1b during focusing becomes excessively small, and the closest distance that is focusable becomes excessively long. Alternatively, the refractive power of the 1b subunit L1b becomes excessively strong, fluctuations in various aberrations during focusing at the telephoto end become excessively large.

The zoom lens according to each example may satisfy the following inequality (8):

$$-12.0 < f1/f2 < -2.0 \qquad (8)$$

where f2 is a focal length of a second lens unit L2 disposed closest to the object in the intermediate group LM.

Inequality (8) defines a condition for obtaining a zoom lens that is beneficial in terms of the high zoom ratio, reduced size and weight, and high optical performance. In a case where the value of f1/f2 becomes higher than the upper limit of inequality (8), the refractive power of the second lens unit L2 closest to the object in the intermediate group LM becomes excessively strong, and fluctuations in aberrations during zooming becomes excessively large. In a case where the value becomes lower than the lower limit of inequality (8), the refractive power of the second lens unit L2 closest to the object in the intermediate group LM becomes excessively weak, a moving amount of the second lens unit L2 during zooming becomes excessively large, and the zoom lens becomes excessively large. Alternatively, it becomes difficult to obtain a zoom lens with a high zoom ratio.

The zoom lens according to each example may satisfy the following inequality (9):

$$20.0 < v1ap - v1an < 40.0 \qquad (9)$$

where v1ap is the average value of the Abbe numbers based on the d-line of all positive lens materials included in the 1a subunit L1a, and v1an is an average value of the Abbe numbers based on the d-line of the materials of all the negative lenses included in the 1a subunit L1a.

Inequality (9) defines a condition for obtaining a zoom lens that is beneficial in terms of the high optical performance. In a case where the value of v1ap-v1an becomes higher than the upper limit of inequality (9), materials with different partial dispersion ratios have to be selected for the positive and negative lenses, and it becomes difficult to keep the second-order longitudinal chromatic aberration within a permissible range at the telephoto end. In a case where the value of v1ap-v1an becomes lower than the lower limit of inequality (9), it becomes difficult to keep the longitudinal chromatic aberration within the permissible range at the telephoto end. Alternatively, the refractive power of each lens becomes excessively strong, and it becomes difficult to keep fluctuations in various aberrations during zooming within permissible ranges.

The zoom lens according to each example may satisfy the following inequality (10):

$$1.0 < f1/f1bc < 2.00 \qquad (10)$$

where f1bc is a combined focal length of the 1b subunit L1b and the 1c subunit L1c in the in-focus state at infinity.

Inequality (10) defines a condition for obtaining a zoom lens that is beneficial in terms of the high optical performance and lightweight focus driving unit. In a case where the value of f1/f1bc becomes higher than the upper limit of inequality (10), the combined refractive power of the 1b subunit L1b and the 1c subunit L1c becomes excessively strong, and fluctuations in various aberrations during focusing becomes excessively large at the telephoto end. In a case where the value of f1/f1bc becomes lower than the lower limit of inequality (10), the combined refractive power of the 1b subunit L1b and the 1c subunit L1c becomes excessively weak, and the 1b subunit L1b becomes large.

Inequalities (3) to (10) may be replaced with inequalities (3a) to (10a) below:

$$0.00 < |f1/f1a| < 0.29 \qquad (3a)$$
$$-0.90 < f1/f1c < -0.10 \qquad (4a)$$
$$0.45 < L11/f1 < 0.80 \qquad (5a)$$
$$0.30 < L1a/f1 < 0.60 \qquad (6a)$$
$$0.02 < L1ab/f1 < 0.15 \qquad (7a)$$
$$-9.0 < f1/f2 < -3.0 \qquad (8a)$$
$$22.0 < v1ap - v1an < 38.0 \qquad (9a)$$
$$1.05 < f1/f1bc < 1.80 \qquad (10a)$$

Inequalities (3) to (10) may be replaced with inequalities (3b) to (10b) below:

$$0.01 < |f1/f1a| < 0.28 \qquad (3b)$$
$$-0.80 < f1/f1c < -0.10 \qquad (4b)$$

9

-continued $$0.50 < L11/f1 < 0.75 \qquad (5b)$$

$$0.35 < L1a/f1 < 0.55 \qquad (6b)$$

$$0.03 < L1ab/f1 < 0.13 \qquad (7b)$$

$$-8.0 < f1/f2 < -3.5 \qquad (8b)$$

$$24.0 < v1ap - v1an < 36.0 \qquad (9b)$$

$$1.10 < f1/f1bc < 1.70 \qquad (10b)$$

A detailed description will now be given of the zoom lenses according to each example.

Example 1

Referring now to FIG. 1, a description will be given of the components of the zoom lens according to Example 1 in order from the object side to the image side. L1 denotes a first lens unit having positive refractive power that does not move for magnification variation (zooming). The 1a subunit (first subunit) L1a in the first lens unit L1 does not move for focusing. The 1b subunit (second subunit) L1b in the first lens unit L1 moves toward the object side for focusing from infinity to the close distance. The 1c subunit (third subunit) L1c in the first lens unit L1 does not move for focusing.

LM denotes an intermediate group that includes a plurality of lens units in which a distance between adjacent lens units changes during zooming. L2 in the intermediate group LM denotes a second lens unit having negative refractive power that moves for zooming, and L3 denotes a third lens unit having negative refractive power that moves for zooming.

The second lens unit L2 monotonically moves on the optical axis toward the image side for zooming from the wide-angle end to the telephoto end. The third lens unit L3 moves non-monotonically on the optical axis as illustrated for zooming from the wide-angle end to the telephoto end. The aperture stop SP does not move during zooming.

LR denotes a rear lens unit (relay lens unit) having positive refractive power that does not move for zooming.

In FIG. 1, the first lens unit L1 has first to fifteenth surfaces. The 1a subunit L1a has the first to ninth surfaces and consists of two negative lenses and three positive lenses. The 1b subunit L1b has the tenth to thirteenth surfaces and consists of two positive lenses. The 1c subunit L1c has the fourteenth and fifteenth surfaces and consists of one negative lens. The intermediate group LM consists of a second lens unit and a third lens unit. The second lens unit L2 has sixteenth to twenty-fourth surfaces and consists of three negative lenses and two positive lenses. The third lens unit L3 has twenty-fifth to twenty-seventh surfaces and consists of one negative lens and one positive lens. The aperture stop SP has a twenty-eighth surface. The rear lens unit LR has twenty-ninth to forty-sixth surfaces and consists of one positive lens having an aspheric surface on the image side, four negative lenses, and six positive lenses.

The zoom lens according to this example satisfies all of inequalities (1) to (10). Therefore, this example can provide a zoom lens that is beneficial in terms of the high zoom ratio, high optical performance, reduced size and weight, and reduced weight of the focus driving unit.

Example 2

Figure 3:
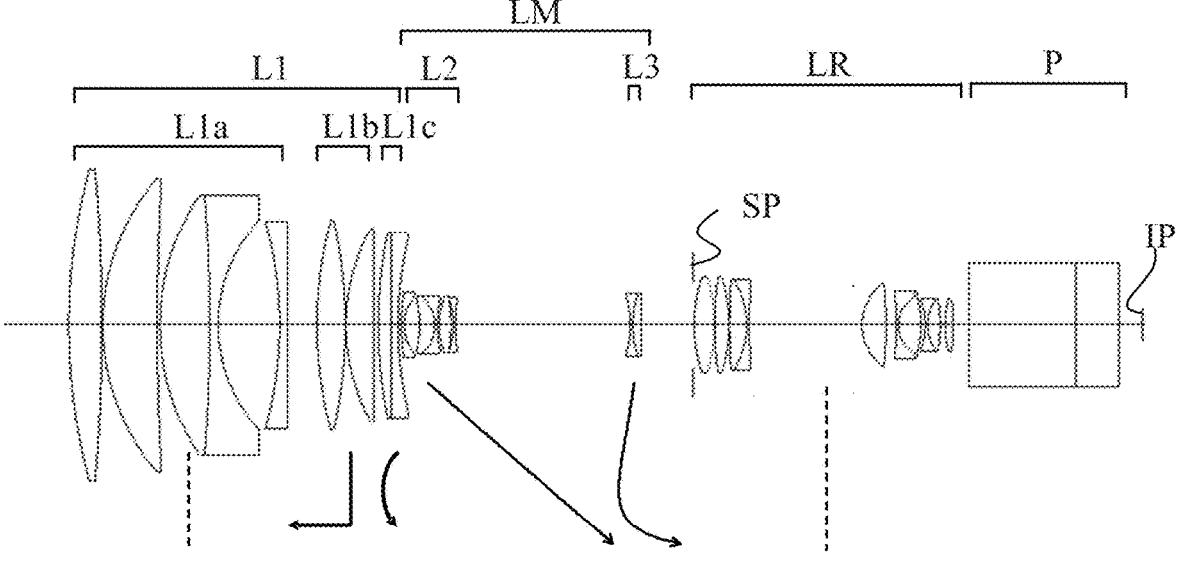
FIG. 3 is a sectional view of a zoom lens according to Example 2 in an in-focus state at infinity at a wide-angle end.
Figures 4A, 4B:
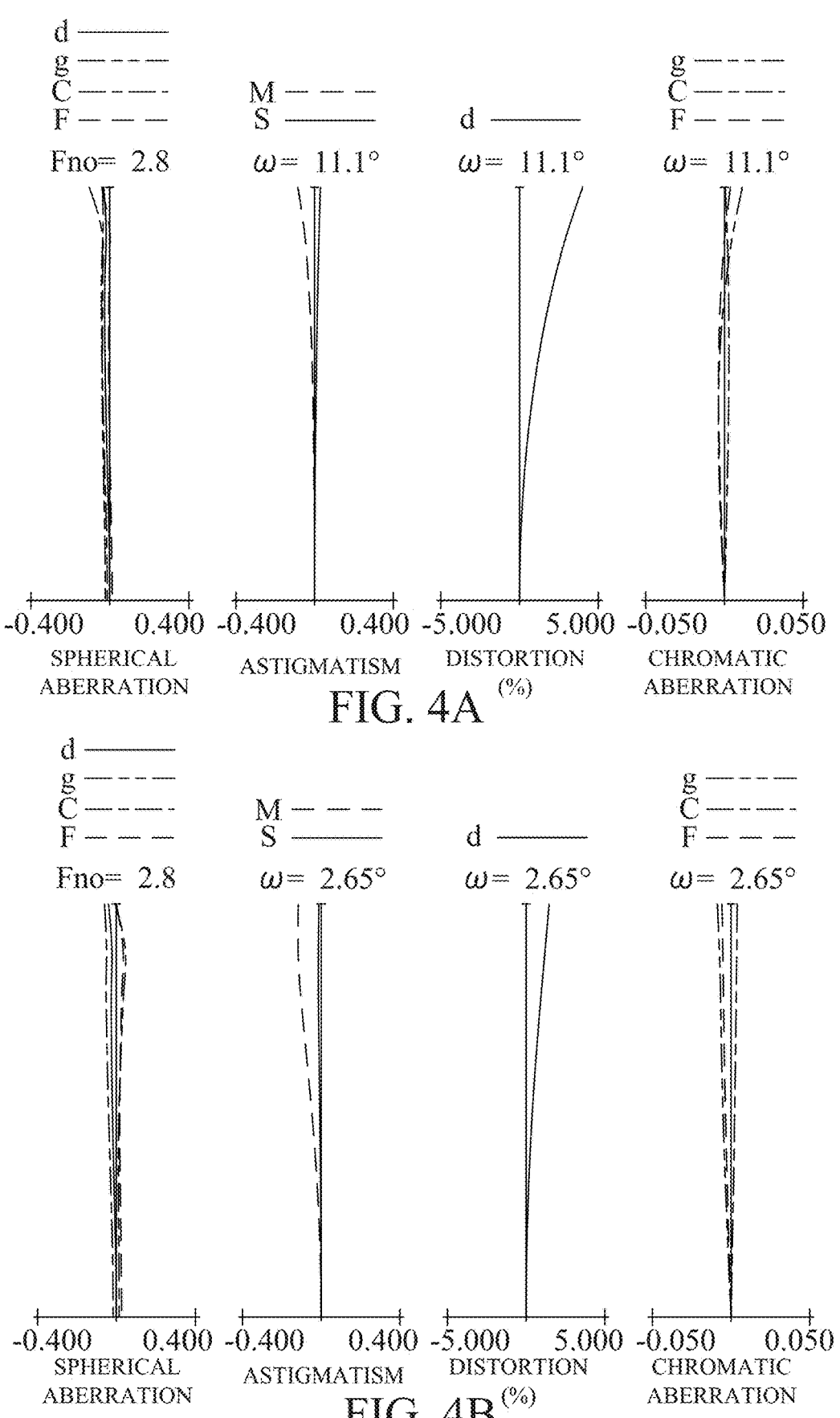
FIGS. 4A, 4B, and 4C are aberration diagrams of the zoom lens according to Example 2 in the in-focus state at infinity at the wide-angle end, an intermediate zoom position, and a telephoto end, respectively.
Figure 4C:
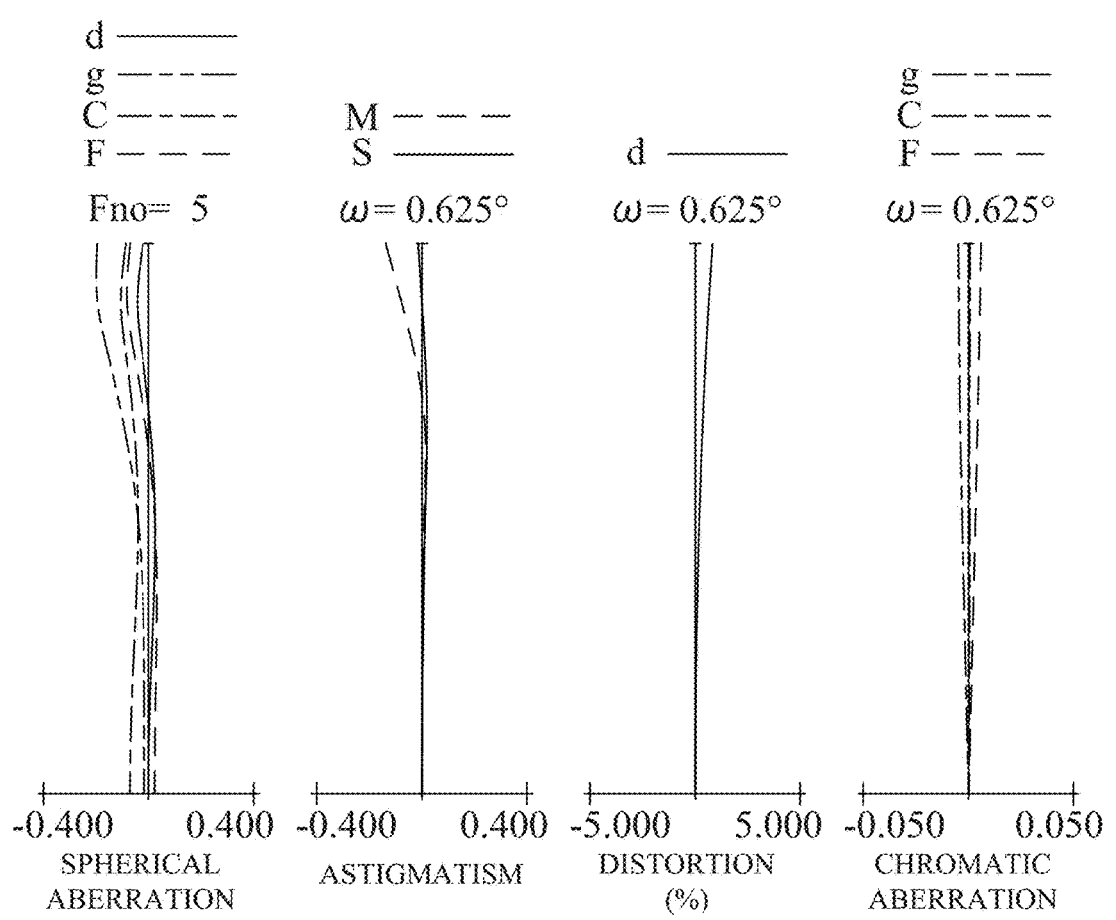

Referring now to FIG. 3, a description will be given of the components of the zoom lens according to Example 2 in order from the object side to the image side. L1 denotes a first lens unit having positive refractive power that does not move for magnification variation (zooming). The 1a subunit (first subunit) L1a in the first lens unit L1 does not move for focusing. The 1b subunit (second subunit) L1b in the first lens unit L1 moves toward the object side for focusing from infinity to the close distance. The 1c subunit (third subunit) L1c in the first lens unit L1 moves for focusing from infinity to the close distance.

LM denotes an intermediate group that includes a plurality of lens units in which a distance between adjacent lens units changes during zooming. L2 in the intermediate group LM denotes a second lens unit having negative refractive power that moves during zooming, and L3 denotes a third lens unit having negative refractive power that moves during zooming. The second lens unit L2 monotonically moves toward the image side during zooming from the wide-angle end to the telephoto end. During zooming from the wide-angle end to the telephoto end, the third lens unit L3 first moves toward the object side and then moves toward the image side. The aperture stop SP does not move during zooming.

LR denotes a rear lens unit having positive refractive power that does not move for zooming.

The first lens unit L1 has first to sixteenth surfaces. The 1a subunit L1a has the first to ninth surfaces and consists of two negative lenses and three positive lenses. The 1b subunit L1b has the tenth to thirteenth surfaces and consists of two positive lenses. The 1c subunit L1c has the fourteenth to sixteenth surfaces and consists of one negative lens and one positive lens. The second lens unit L2 has seventeenth to twenty-fifth surfaces and consists of three negative lenses and two positive lenses. The third lens unit L3 has twenty-sixth to twenty-eighth surfaces and consists of one positive lens and one negative lens. The aperture stop SP has a twenty-ninth surface. The rear lens unit LR has thirtieth to forty-sixth surfaces and includes one positive lens having an aspheric surface on the image side, four negative lenses, and six positive lenses.

In the zoom lens according to this example, Mb denotes a moving amount of the 1b subunit L1b during focusing from infinity to the close distance, and Mc denotes a moving amount of 1c subunit L1c during focusing from infinity to the close distance. At this time, a relationship between the moving amounts of the 1b subunit and the 1c subunit satisfies the following equation where the sign of the moving amount is positive in the image side direction.

$$Mc = 1.1329 \times Mb + 0.1239 \times Mb^2$$

The zoom lens according to this example satisfies all of inequalities (1) to (10). Therefore, this example can provide a zoom lens that is beneficial in terms of the high zoom ratio, high optical performance, reduced size and weight, and reduced weight of the focus driving unit.

Example 3

Figure 5:
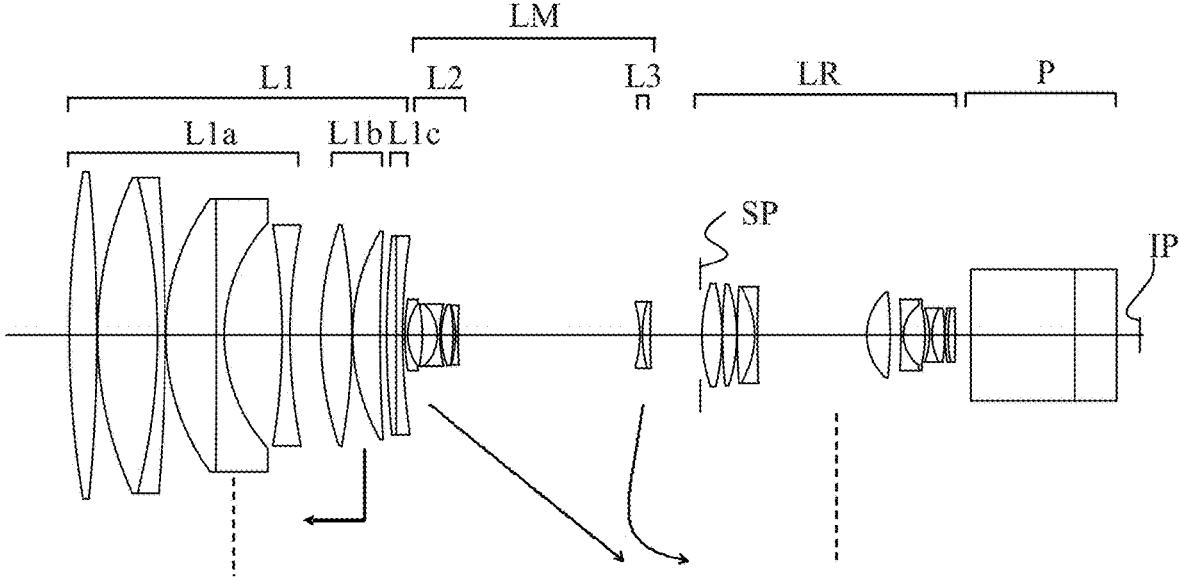
FIG. 5 is a lens sectional view of a zoom lens according to Example 3 in an in-focus state at infinity at a wide-angle end.
Figures 6A, 6B:
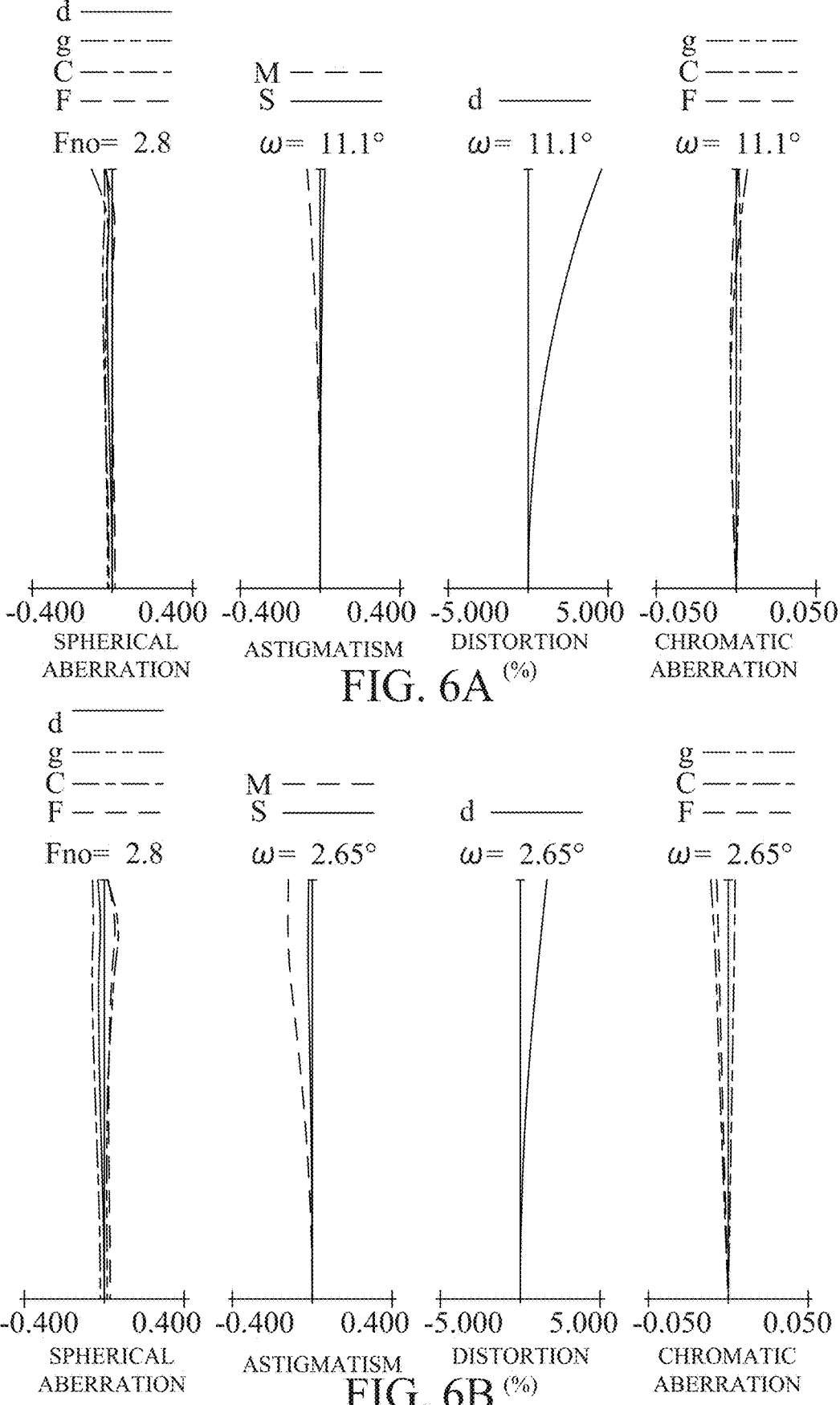
FIGS. 6A, 6B, and 6C are aberration diagrams of the zoom lens according to Example 3 in the in-focus state at infinity at the wide-angle end, an intermediate zoom position, and a telephoto end, respectively.
Figure 6C:
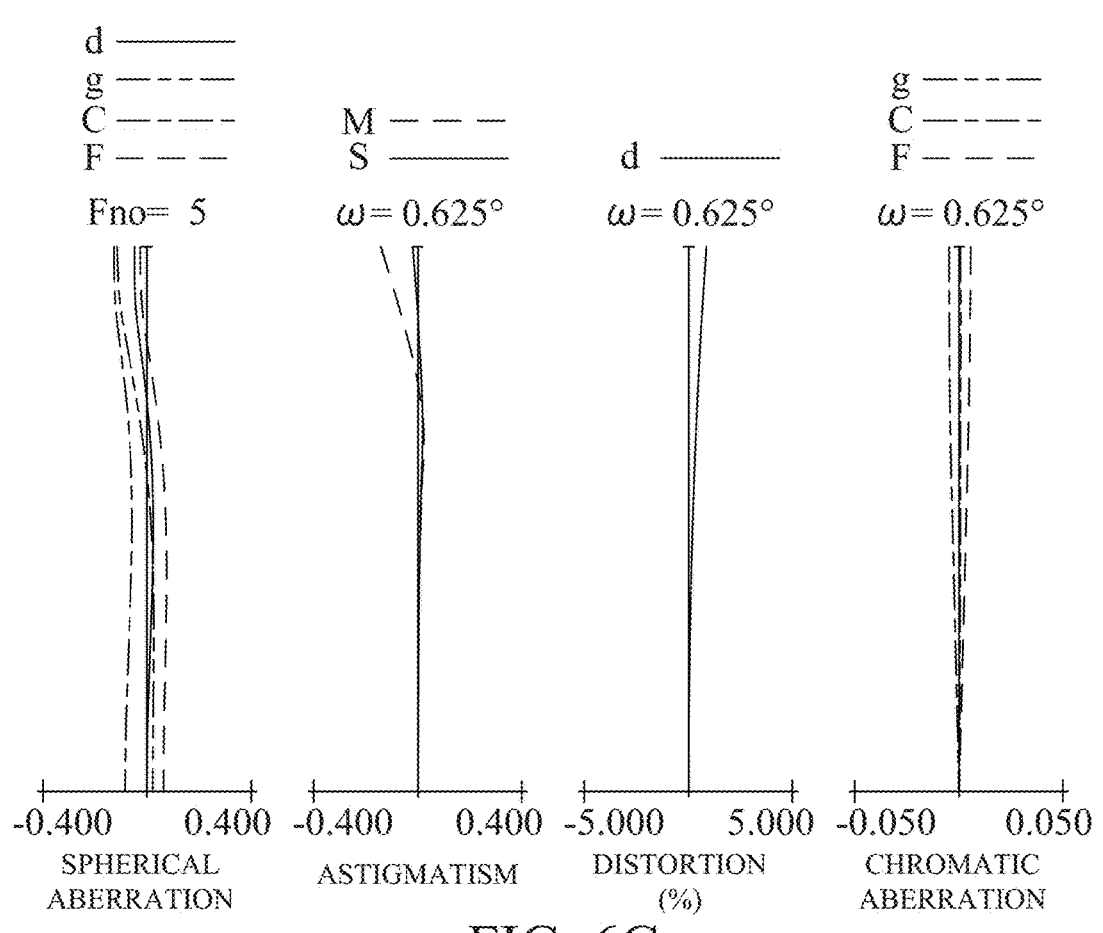

Referring now to FIG. 5, a description will be given of the components of the zoom lens according to Example 3 in order from the object side to the image side. L1 denotes a first lens unit having positive refractive power that does not move for magnification variation (zooming). The 1a subunit (first subunit) L1a in the first lens unit L1 does not move for focusing. The 1b subunit (second subunit) L1b in the first lens unit L1 moves toward the object side for focusing from infinity to the close distance. The 1c subunit (third subunit) L1c in the first lens unit L1 does not move for focusing.

LM denotes an intermediate group that includes a plurality of lens units in which a distance between adjacent lens units changes during zooming. L2 in the intermediate group LM denotes a second lens unit having negative refractive power that moves during zooming, and L3 denotes a third lens unit having negative refractive power that moves during zooming. The second lens unit L2 monotonically moves toward the image side during zooming from the wide-angle end to the telephoto end. During zooming from the wide-angle end to the telephoto end, the third lens unit L3 first moves toward the object side and then moves toward the image side. The aperture stop SP does not move during zooming.

LR is a rear lens unit having positive refractive power that does not move for zooming.

The first lens unit L1 has first to seventeenth surfaces. The 1a subunit L1a has the first to tenth surfaces and consists of three negative lenses and three positive lenses. The 1b subunit L1b has the eleventh to fourteenth surfaces and consists of two positive lenses. The 1c subunit L1c has the fifteenth to seventeenth surfaces and consists of one negative lens and one positive lens. The second lens unit L2 has eighteenth to twenty-sixth surfaces and consists of three negative lenses and two positive lenses. The third lens unit L3 has twenty-seventh to twenty-ninth surfaces and consists of one positive lens and one negative lens. The aperture stop SP has a thirtieth surface. The rear lens unit LR has thirty-first to forty-eighth surfaces and includes one positive lens having an aspheric surface on the image side, four negative lenses, and six positive lenses.

The zoom lens according to this example satisfies all of inequalities (1) to (10). Therefore, this example can provide a zoom lens that is beneficial in terms of the high zoom ratio, high optical performance, reduced size and weight, and reduced weight of the focus driving unit.

Example 4

Figure 7:
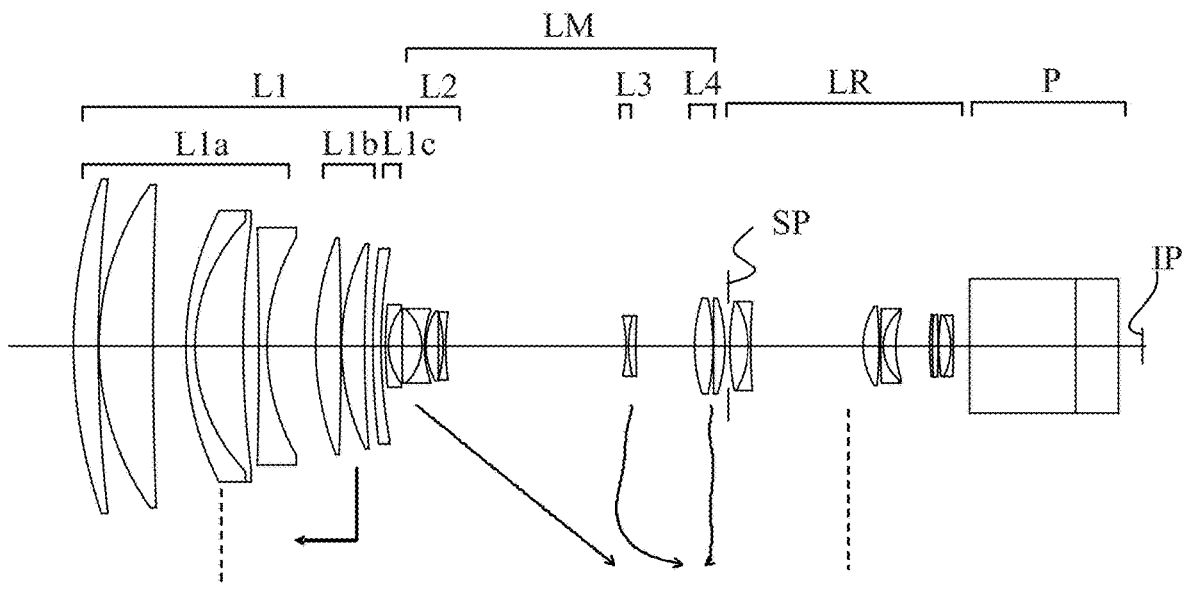
FIG. 7 is a sectional view of a zoom lens according to Example 4 in an in-focus state at infinity at a wide-angle end.
Figures 8A, 8B:
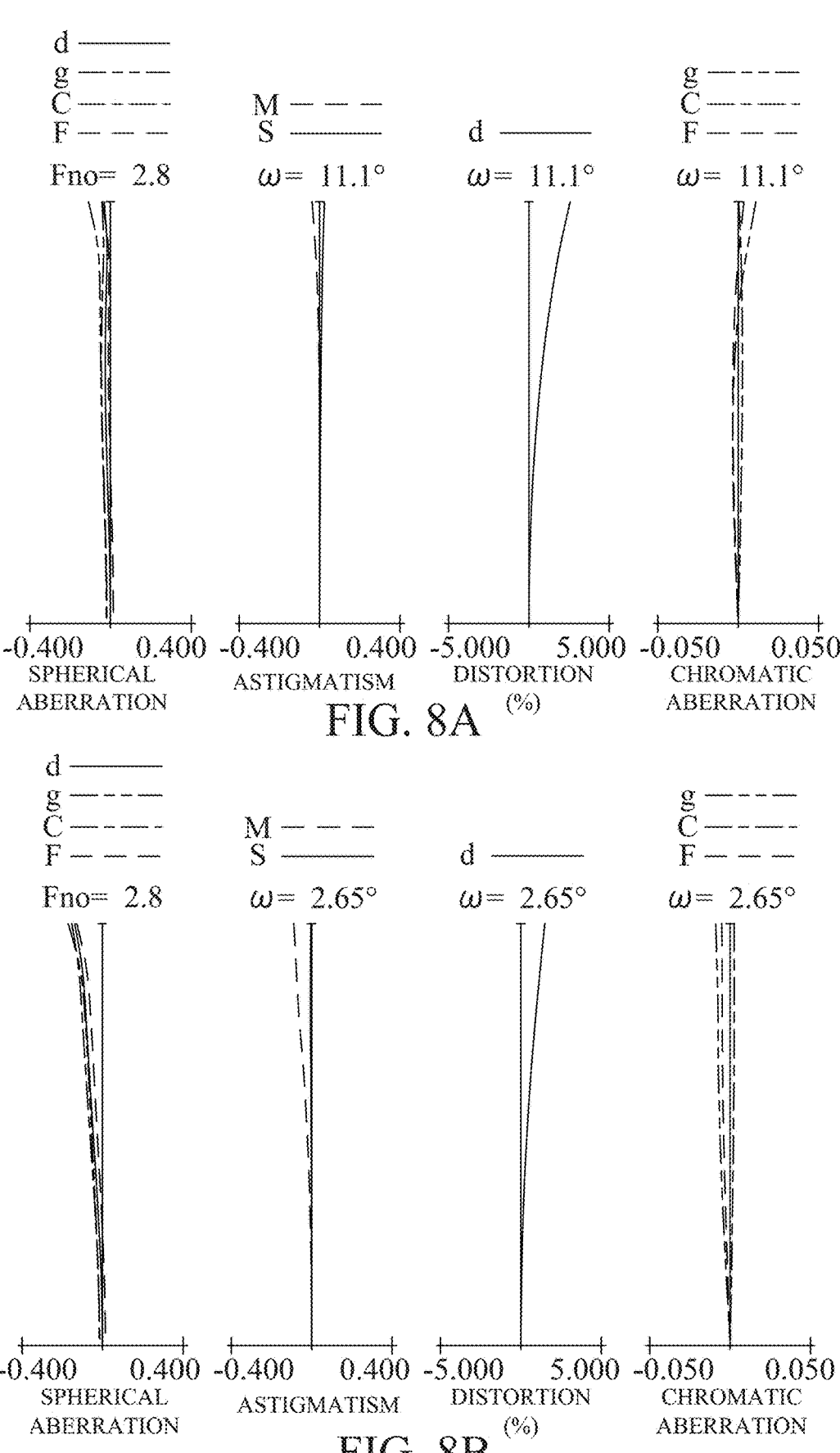
FIGS. 8A, 8B, and 8C are aberration diagrams of the zoom lens according to Example 4 in the in-focus state at infinity at the wide-angle end, an intermediate zoom position, and a telephoto end, respectively.
Figure 8C:
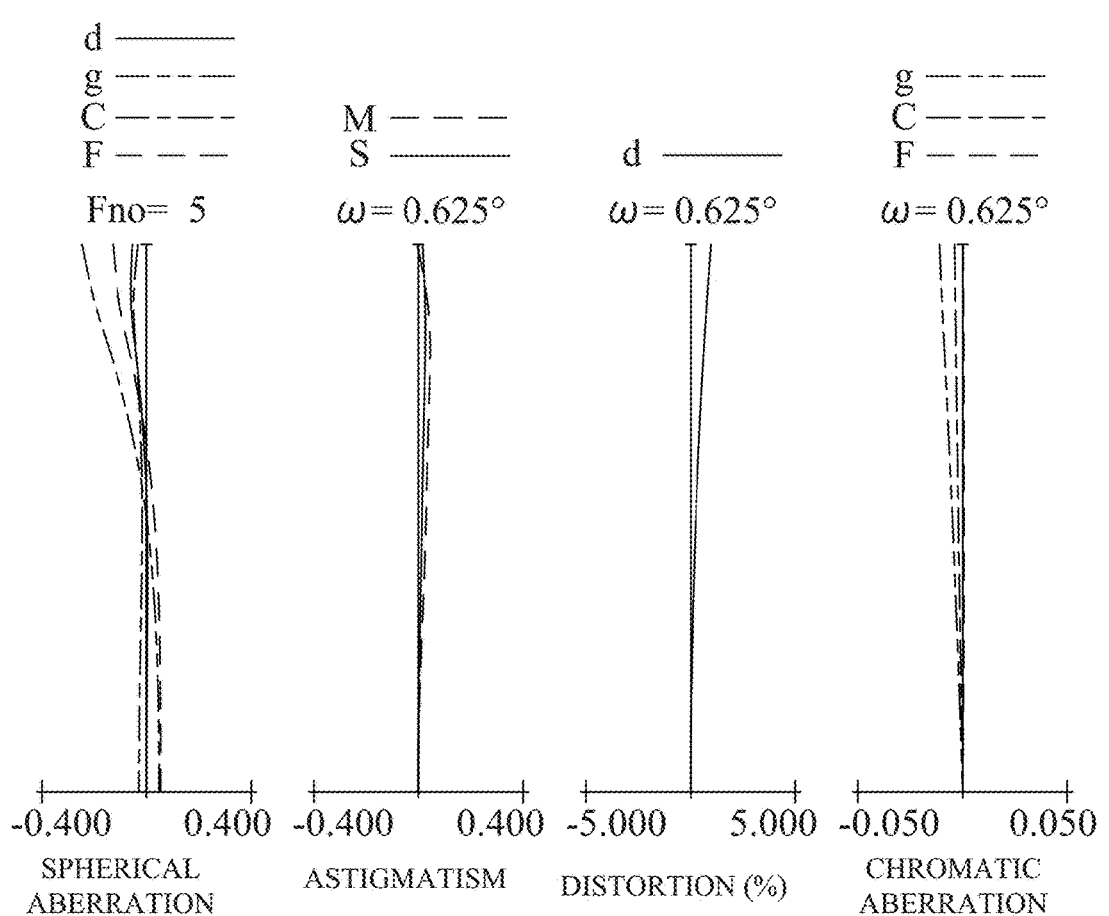

Referring now to FIG. 7, a description will be given of the components of the zoom lens according to Example 4 in order from the object side to the image side. L1 denotes a first lens unit having positive refractive power that does not move for magnification variation (zooming). The 1a subunit (first subunit) L1a in the first lens unit L1 does not move for focusing. The 1b subunit (second subunit) L1b in the first lens unit L1 moves toward the object side for focusing from infinity to the close distance. The 1c subunit (third subunit) L1c in the first lens unit L1 does not move for focusing.

LM denotes an intermediate group that includes a plurality of lens units in which a distance between adjacent lens units changes during zooming. L2 in the intermediate group LM denotes a second lens unit having negative refractive power that moves during zooming, L3 denotes a third lens unit having negative refractive power that moves during zooming, and L4 denotes a fourth lens unit having positive refractive power that moves during zooming. The second lens unit L2 monotonically moves toward the image side during zooming from the wide-angle end to the telephoto end. During zooming from the wide-angle end to the telephoto end, the third lens unit L3 first moves toward the object side and then moves toward the image side. The fourth lens unit L4 moves non-monotonically as illustrated during zooming from the wide-angle end to the telephoto end. The aperture stop SP does not move during zooming.

LR denotes a rear lens unit having positive refractive power that does not move for zooming.

The first lens unit L1 has first to fifteenth surfaces. The 1a subunit L1a has the first to ninth surfaces and consists of two negative lenses and three positive lenses. The 1b subunit L1b has the tenth to thirteenth surfaces and consists of two positive lenses. The 1c subunit L1c has the fourteenth and fifteenth surfaces and consists of one negative lens. The second lens unit L2 has sixteenth to twenty-fourth surfaces and consists of three negative lenses and two positive lenses. The third lens unit L3 has twenty-fifth to twenty-seventh surfaces and consists of one positive lens and one negative lens. The fourth lens unit L4 has twenty-eighth to thirty-first surfaces and includes one positive lens having an aspheric surface on the image side, and one positive lens. The aperture stop SP has a thirty-second surface. The rear lens unit LR has thirty-third to forty-sixth surfaces and consists of four negative lenses and five positive lenses.

The zoom lens according to this example satisfies all of inequalities (1) to (10). Therefore, this example can provide a zoom lens that is beneficial in terms of the high zoom ratio, high optical performance, reduced size and weight, and reduced weight of the focus driving unit.

Example 5

Figure 9:
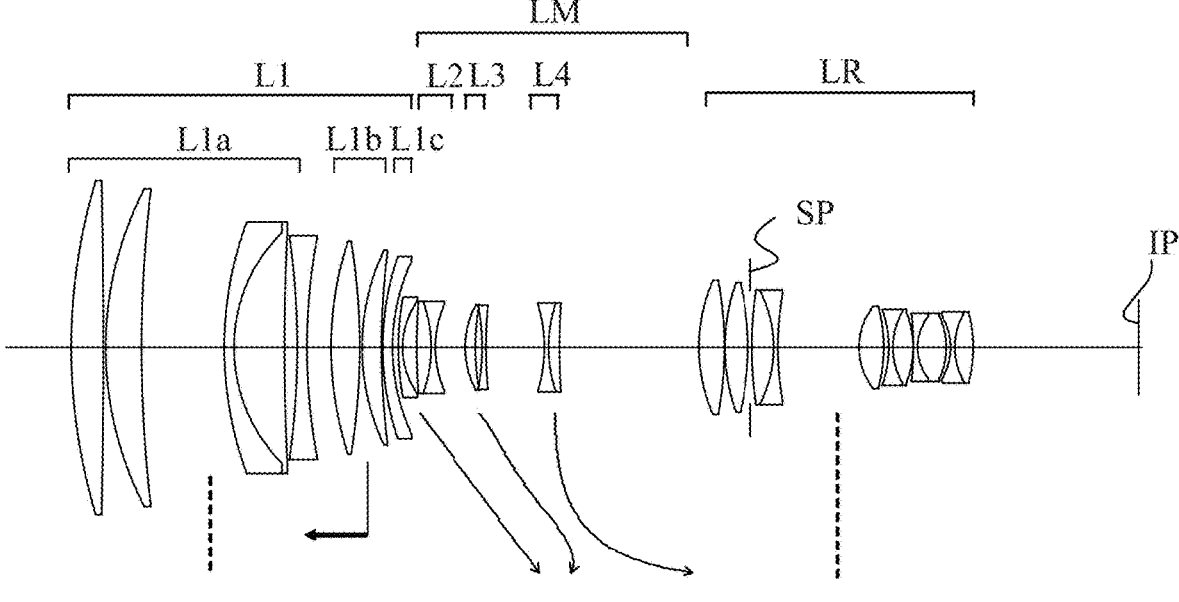
FIG. 9 is a sectional view of a zoom lens according to Example 5 in an in-focus state at infinity at a wide-angle end.
Figures 10A, 10B:
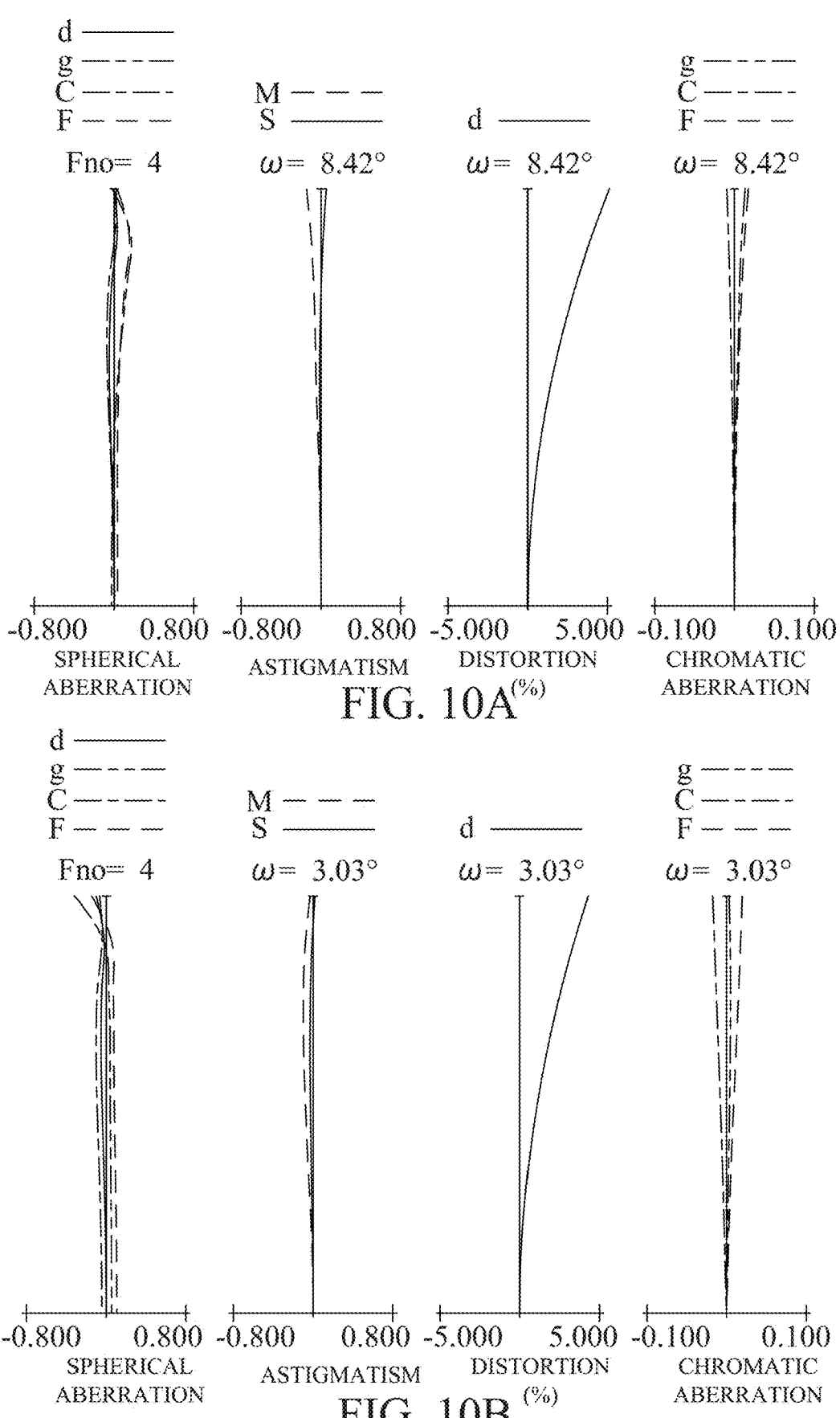
FIGS. 10A, 10B, and 10C are aberration diagrams of the zoom lens according to Example 5 in the in-focus state at infinity at the wide-angle end, an intermediate zoom position, and a telephoto end, respectively.
Figure 10C:
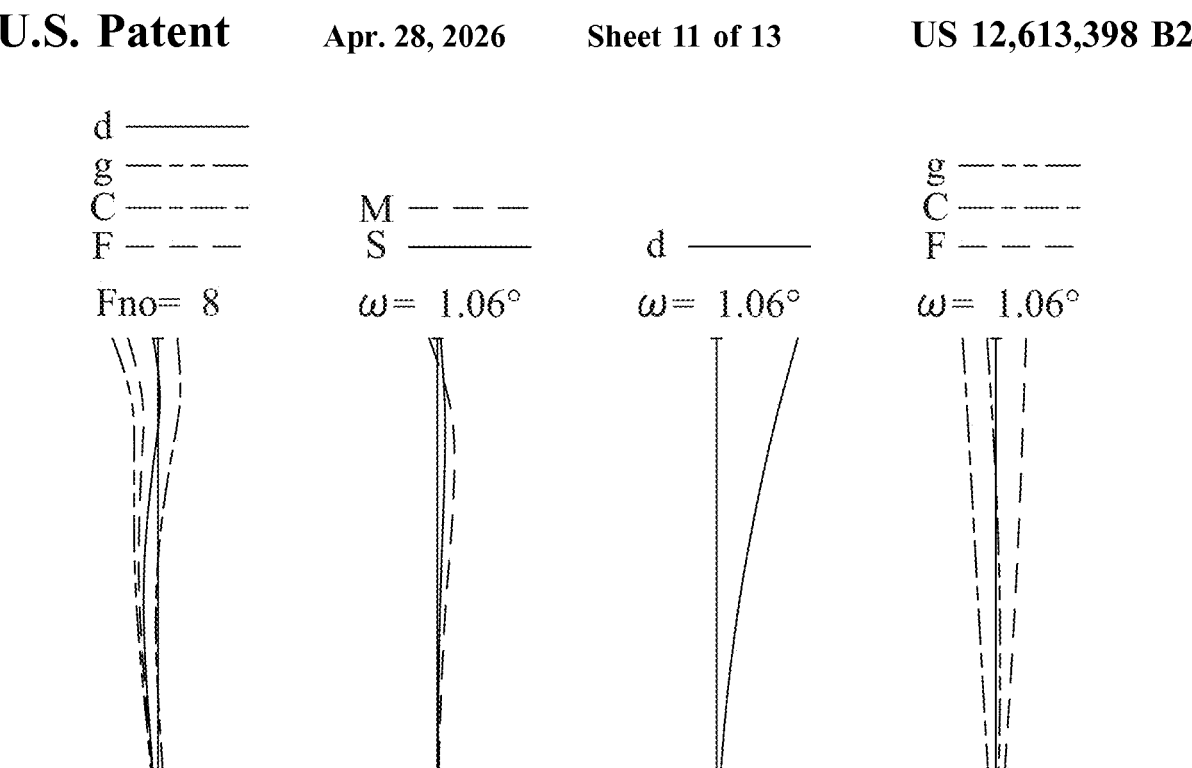

Referring now to FIG. 9, a description will be given of the components of the zoom lens according to Example 5 in order from the object side to the image side. L1 denotes a first lens unit having positive refractive power that does not move for magnification variation (zooming). The 1a subunit (first subunit) L1a in the first lens unit L1 does not move for focusing. The 1b subunit (second subunit) L1b in the first lens unit L1 moves toward the object side for focusing from infinity to the close distance. The 1c subunit (third subunit) L1c in the first lens unit L1 does not move for focusing.

LM denotes an intermediate group that includes a plurality of lens units in which a distance between adjacent lens units changes during zooming. L2 in the intermediate group LM denotes a second lens unit having negative refractive power that moves during zooming, L3 denotes a third lens unit having negative refractive power that moves during zooming, and L4 denotes a fourth lens unit having negative refractive power that moves during zooming. The second lens unit L2 monotonically moves toward the image side during zooming from the wide-angle end to the telephoto end. During zooming from the wide-angle end to the telephoto end, the third lens unit L3 first moves toward the image side and then moves toward the object side. The fourth lens unit L4 moves toward the image side during zooming from the wide-angle end to the telephoto end. The aperture stop SP does not move during zooming.

LR denotes a rear lens unit having positive refractive power that does not move for zooming.

The first lens unit L1 has first to fifteenth surfaces. The 1a subunit L1a has the first to ninth surfaces and consists of two negative lenses and three positive lenses. The 1b subunit L1b has the tenth to thirteenth surfaces and consists of two positive lenses. The 1c subunit L1c has the fourteenth and fifteenth surfaces and consists of one negative lens. The second lens unit L2 has sixteenth to twentieth surfaces and consists of two negative lenses and one positive lens. The third lens unit L3 has twenty-first to twenty-fourth surfaces and consists of one positive lens and one negative lens. The fourth lens unit L4 has the twenty-fifth to twenty-seventh surfaces and consists of one positive lens and one negative lens. The rear lens unit LR has twenty-eighth to forty-sixth surfaces and has one positive lens having an aspheric surface on the image side, four negative lenses, and six positive lenses. The aperture stop SP has a thirty-second surface.

The zoom lens according to this example satisfies all of inequalities (1) to (10). Therefore, this example can provide a zoom lens that is beneficial in terms of the high zoom ratio, high optical performance, reduced size and weight, and reduced weight of the focus driving unit.

Example 6

Figure 11:
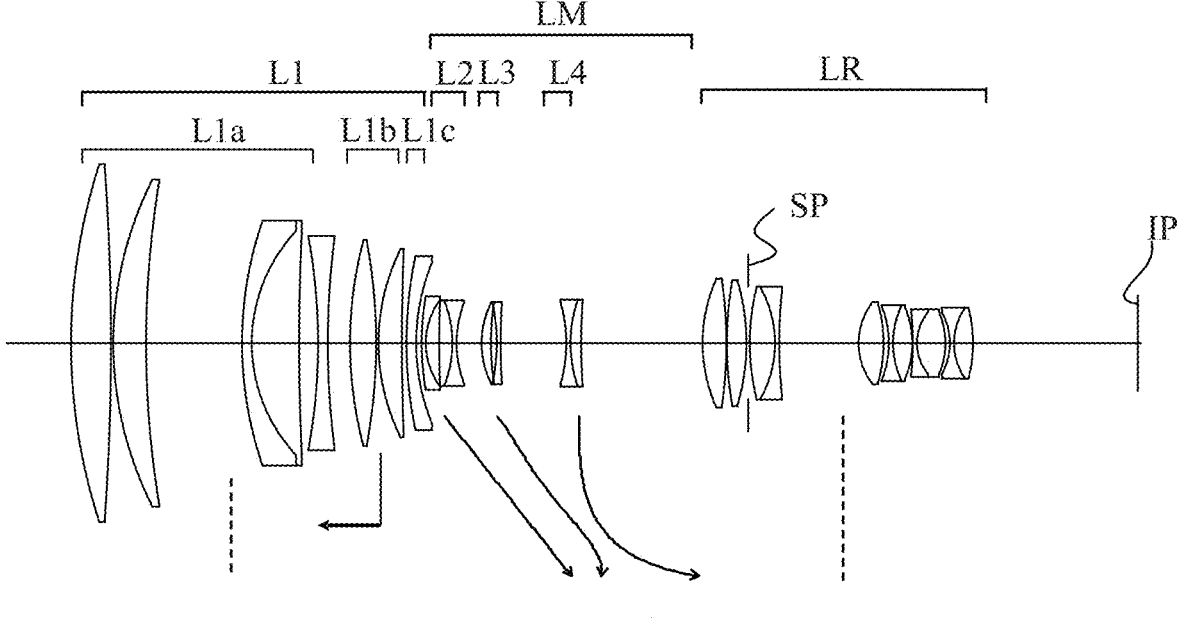
FIG. 11 is a sectional view of a zoom lens according to Example 6 in an in-focus state at infinity at a wide-angle end.

Referring now to FIG. 11, a description will be given of the components of the zoom lens according to Example 6 in order from the object side to the image side. L1 denotes a first lens unit having positive refractive power that does not move for magnification variation (zooming). The 1a subunit (first subunit) L1a in the first lens unit L1 does not move for focusing. The 1b subunit (second subunit) L1b in the first lens unit L1 moves toward the object side for focusing from infinity to the close distance. The 1c subunit (third subunit) L1c in the first lens unit L1 does not move for focusing.

LM denotes an intermediate group that includes a plurality of lens units in which a distance between adjacent lens units changes during zooming. L2 in the intermediate group LM denotes a second lens unit having negative refractive power that moves during zooming, L3 denotes a third lens unit having negative refractive power that moves during zooming, and L4 denotes a fourth lens unit having negative refractive power that moves during zooming. The second lens unit L2 monotonically moves toward the image side during zooming from the wide-angle end to the telephoto end. During zooming from the wide-angle end to the telephoto end, the third lens unit L3 first moves toward the image side and then moves toward the object side. The fourth lens unit L4 moves toward the image side during zooming from the wide-angle end to the telephoto end. The aperture stop SP does not move during zooming.

LR denotes a rear lens unit having positive refractive power that does not move for zooming.

The first lens unit L1 has first to fifteenth surfaces. The 1a subunit L1a has the first to ninth surfaces and consists of two negative lenses and three positive lenses. The 1b subunit L1b has the tenth to thirteenth surfaces and consists of two positive lenses. The 1c subunit L1c has the fourteenth and fifteenth surfaces and consists of one negative lens. The second lens unit L2 has sixteenth to twentieth surfaces and consists of two negative lenses and one positive lens. The third lens unit L3 has twenty-first to twenty-fourth surfaces and consists of one positive lens and one negative lens. The fourth lens unit L4 has twenty-fifth to twenty-seventh surfaces and consists of one positive lens and one negative lens. The rear lens unit LR has twenty-eighth to forty-sixth surfaces and includes one positive lens having an aspheric surface on the image side, four negative lenses, and six positive lenses. The aperture stop SP has a thirty-second surface.

The zoom lens according to this example satisfies all of inequalities (1) to (10). Therefore, this example can provide a zoom lens that is beneficial in terms of the high zoom ratio, high optical performance, reduced size and weight, and reduced weight of the focus driving unit.

In the zoom lenses according to Examples 1 to 6, the rear lens unit LR does not move during zooming, but the rear lens unit LR or a part it (subunit) may move during zooming. Even in this case, the effects described above can be obtained. For example, in the zoom lens according to Example 1, the thirty-sixth to forty-sixth surfaces in the rear lens unit LR may move during zooming. Since an approximately afocal light beam enters the thirty-sixth surface from the object side, the optical characteristics other than the back focus remain approximately unchanged even if that portion moves during zooming. Therefore, moving this portion during zooming can correct focus changes caused by state changes in the zoom lens, such as those relating to zoom, focus, aperture stop, temperature, atmospheric pressure, orientation, insertion and removal of a magnification-varying optical system, and the like.

Numerical examples 1 to 6 corresponding to Examples 1 to 6 will be illustrated below.

In surface data of each numerical example, r represent a radius of curvature of each optical surface, and d (mm) represents an on-axis distance (distance on the optical axis) between an m-th surface and an (m+1)-th surface, where m is a surface number counted from the light incident side. nd represents a refractive index for the d-line of each optical element, and vd represents an Abbe number of the optical element based on the d-line. The Abbe number vd of a certain material is expressed as follows:

$$vd = (Nd - 1)/(NF - NC)$$

where Nd, NF, and NC are refractive indices based on the d-line (587.6 nm), the F-line (486.1 nm), and the C-line (656.3 nm) in the Fraunhofer line, respectively.

In each numerical example, values of d, a focal length (mm), an F-number, and a half angle of view (°) are set in a case where the optical system according to each example is in the in-focus state on the infinity object. The half angle of view (°) is calculated using the formula $\omega = \arctan (Y/fw)$, where the diagonal image size of the camera in which the zoom lens is used is 2Y, and the focal length of the zoom lens at the wide-angle end is fw. expressed. The image height corresponds to half Y (e.g., 5.50 mm) of the diagonal image size 2Y (e.g., 11.00 mm). A back focus BF is a distance on the optical axis from the final lens surface (lens surface closest to the image plane) of the zoom lens L0 to the paraxial image plane expressed in air conversion length. The overall lens length of the zoom lens L0 is a length obtained by adding the back focus to a distance on the optical axis from the first lens surface (lens surface closest to the object) to the final lens surface. The lens unit includes one or more lenses.

In a case where the optical surface is aspherical, an asterisk * is attached to the right side of the surface number. The aspherical shape is expressed as follows:

$$X = \left(h^2/R\right) \Big/ \left[1 + \left\{1 - (1 + K)(h/R)^2\right\}^{1/2}\right] +$$
$$A4 \times h^4 + A6 \times h^6 + A8 \times h^8 + A10 \times h^{10} + A12 \times h^{12}$$

where X is a displacement amount from a surface vertex in the optical axis direction, h is a height from the optical axis in a direction orthogonal to the optical axis, a light traveling direction is set positive, R is a paraxial radius of curvature, K is a conic constant, and A4, A6, A8, A10, and A12 are aspheric coefficients. "e±XX" in each aspheric coefficient means "$\times 10^{\pm XX}$."

Numerical Example 1

| UNIT: mm | | | | |
|---|---|---|---|---|
| SURFACE DATA | | | | |
| Surface No. | r | d | nd | vd |
| 1 | 162.989 | 7.97 | 1.48749 | 70.2 |
| 2 | 567.828 | 0.20 | | |
| 3 | 84.744 | 16.35 | 1.43387 | 95.1 |
| 4 | 765.127 | 10.79 | | |
| 5 | 87.911 | 2.80 | 1.65160 | 58.5 |
| 6 | 53.477 | 15.43 | 1.43875 | 94.7 |
| 7 | 284.103 | 4.46 | | |
| 8 | −2694.548 | 2.50 | 1.75500 | 52.3 |
| 9 | 65.679 | 14.84 | | |
| 10 | 86.386 | 7.66 | 1.43387 | 95.1 |
| 11 | −19497.657 | 0.20 | | |
| 12 | 68.663 | 6.93 | 1.43387 | 95.1 |
| 13 | 278.500 | 1.29 | | |
| 14 | 125.590 | 2.50 | 1.65160 | 58.5 |
| 15 | 95.113 | (Variable) | | |
| 16 | 93.477 | 0.90 | 1.75106 | 43.1 |
| 17 | 18.345 | 4.10 | | |
| 18 | 211.167 | 6.27 | 1.67300 | 38.3 |
| 19 | −15.453 | 0.80 | 1.61800 | 63.3 |
| 20 | 31.400 | 0.46 | | |
| 21 | 20.392 | 3.53 | 1.61340 | 44.3 |
| 22 | 178.308 | 1.70 | | |
| 23 | −33.689 | 0.80 | 1.53775 | 74.7 |
| 24 | 65.976 | (Variable) | | |
| 25 | −37.684 | 0.80 | 1.71700 | 47.9 |
| 26 | 36.983 | 2.36 | 1.84666 | 23.8 |
| 27 | 197.567 | (Variable) | | |
| 28 (SP) | ∞ | 0.50 | | |
| 29 | 49.692 | 6.40 | 1.59522 | 67.7 |
| 30* | −48.570 | 0.10 | | |
| 31 | 70.866 | 4.07 | 1.43875 | 94.7 |
| 32 | −81.368 | 0.10 | | |
| 33 | 72.002 | 5.60 | 1.43875 | 94.7 |
| 34 | −29.469 | 0.90 | 1.80610 | 40.9 |
| 35 | 80.457 | 35.27 | | |
| 36 | 25.150 | 4.72 | 1.43875 | 94.7 |
| 37 | −104.270 | 1.63 | | |
| 38 | 1182.622 | 0.80 | 1.65160 | 58.5 |
| 39 | 14.485 | 3.46 | 1.60342 | 38.0 |
| 40 | 31.487 | 7.72 | | |
| 41 | 47.704 | 0.80 | 1.95375 | 32.3 |
| 42 | 49.830 | 2.28 | 1.56732 | 42.8 |
| 43 | −867.359 | 2.00 | | |
| 44 | 68.352 | 3.69 | 1.54072 | 47.2 |
| 45 | −24.218 | 0.80 | 1.85920 | 33.0 |
| 46 | −175.463 | 5.00 | | |
| 47 | ∞ | 33.00 | 1.60859 | 46.4 |
| 48 | ∞ | 13.20 | 1.51680 | 64.2 |
| 49 | ∞ | 7.38 | | |
| Image Plane | ∞ | | | |

| ASPHERIC DATA | | | | |
|---|---|---|---|---|
| 30th Surface | | | | |

K = 0.00000e+00 A 4 = 1.55706e−06 A 6 = −4.60684e−10 A 8 = −2.67150e−12
A10 = 9.61772e−17

| VARIOUS DATA ZOOM RATIO 18.00 | | | |
|---|---|---|---|
| | WIDE | MIDDLE | TELE |
| Focal length | 28.00 | 119.00 | 504.00 |
| Fno | 2.80 | 2.80 | 5.00 |
| Half Angle of View (°) | 11.11 | 2.65 | 0.63 |
| Image Height | 5.50 | 5.50 | 5.50 |
| Overall Lens Length | 331.10 | 331.10 | 331.10 |

-continued

| UNIT: mm | | | |
|---|---|---|---|
| BF | 7.38 | 7.38 | 7.38 |
| d15 | 1.48 | 45.13 | 63.49 |
| d24 | 58.70 | 9.95 | 10.68 |
| d27 | 15.83 | 20.93 | 1.83 |

| ZOOM LENS UNIT DATA | | |
|---|---|---|
| Lens Unit | Starting Surface | Focal length |
| 1 | 1 | 161.03 |
| 2 | 16 | −21.01 |
| 3 | 25 | −50.26 |
| 4 | 28 | 48.25 |

Numerical Example 2

| UNIT: mm | | | |
|---|---|---|---|
| SURFACE DATA | | | |
| Surface No. | r | d | nd | vd |
|---|---|---|---|---|
| 1 | 215.270 | 10.24 | 1.48749 | 70.2 |
| 2 | −612.508 | 0.20 | | |
| 3 | 80.320 | 16.80 | 1.43387 | 95.1 |
| 4 | 917.486 | 0.89 | | |
| 5 | 82.082 | 15.48 | 1.43875 | 94.7 |
| 6 | −565.724 | 2.50 | 1.65160 | 58.5 |
| 7 | 54.400 | 18.95 | | |
| 8 | −136.841 | 2.50 | 1.75500 | 52.3 |
| 9 | −5583.956 | 8.96 | | |
| 10 | 144.813 | 8.75 | 1.43387 | 95.1 |
| 11 | −170.976 | 0.20 | | |
| 12 | 72.597 | 8.62 | 1.43387 | 95.1 |
| 13 | 7517.849 | 1.35 | | |
| 14 | 170.015 | 4.08 | 1.75106 | 43.1 |
| 15 | 90002.432 | 2.00 | 1.83481 | 42.7 |
| 16 | 138.605 | (Variable) | | |
| 17 | 70.958 | 0.90 | 1.75106 | 43.1 |
| 18 | 15.893 | 4.69 | | |
| 19 | −46.040 | 4.72 | 1.67300 | 38.3 |
| 20 | −12.867 | 0.80 | 1.61800 | 63.3 |
| 21 | 43.887 | 0.49 | | |
| 22 | 24.958 | 3.76 | 1.61340 | 44.3 |
| 23 | −50.522 | 0.87 | | |
| 24 | −26.580 | 0.80 | 1.53775 | 74.7 |
| 25 | 134.689 | (Variable) | | |
| 26 | −36.170 | 0.80 | 1.71700 | 47.9 |
| 27 | 38.320 | 2.45 | 1.84666 | 23.8 |
| 28 | 239.276 | (Variable) | | |
| 29 (SP) | ∞ | 0.50 | | |
| 30 | 52.648 | 6.24 | 1.59522 | 67.7 |
| 31* | −57.900 | 0.10 | | |
| 32 | 121.876 | 4.43 | 1.43875 | 94.7 |
| 33 | −54.248 | 0.10 | | |
| 34 | 210.887 | 5.51 | 1.43875 | 94.7 |
| 35 | −28.510 | 0.90 | 1.80610 | 40.9 |
| 36 | 408.945 | 34.56 | | |
| 37 | 18.280 | 7.41 | 1.43875 | 94.7 |
| 38 | −155.178 | 2.99 | | |
| 39 | −395.036 | 0.80 | 1.65160 | 58.5 |
| 40 | 11.748 | 6.93 | 1.60342 | 38.0 |
| 41 | −39.304 | 1.35 | | |
| 42 | −25.242 | 0.80 | 1.95375 | 32.3 |
| 43 | 17.012 | 3.76 | 1.56732 | 42.8 |
| 44 | −58.292 | 1.58 | | |
| 45 | 40.527 | 2.28 | 1.64769 | 33.8 |
| 46 | −256.350 | 5.00 | | |
| 47 | ∞ | 33.00 | 1.60859 | 46.4 |
| 48 | ∞ | 13.20 | 1.51680 | 64.2 |
| 49 | ∞ | 7.40 | | |
| Image Plane | ∞ | | | |

-continued

| UNIT: mm |
| --- |

| ASPHERIC DATA |
| --- |

| 31st Surface |
| --- |

K = 0.00000e+00 A 4 = 1.61302e−06 A 6 = −4.17392e−10 A 8 = −2.87905e−12
A10 = 2.15425e−15

VARIOUS DATA
ZOOM RATIO 18.00

|  | WIDE | MIDDLE | TELE |
| --- | --- | --- | --- |
| Focal length | 28.00 | 119.00 | 504.00 |
| Fno | 2.80 | 2.80 | 5.00 |
| Half Angle of View (°) | 11.11 | 2.65 | 0.63 |
| Image Height | 5.50 | 5.50 | 5.50 |
| Overall Lens Length | 331.08 | 331.08 | 331.08 |
| BF | 7.40 | 7.40 | 7.40 |
| d16 | 0.95 | 41.44 | 57.98 |
| d25 | 53.65 | 8.38 | 10.62 |
| d28 | 15.86 | 20.63 | 1.86 |

ZOOM LENS UNIT DATA

| Lens Unit | Starting Surface | Focal length |
| --- | --- | --- |
| 1 | 1 | 147.02 |
| 2 | 17 | −19.65 |
| 3 | 26 | −49.86 |
| 4 | 29 | 40.47 |

Numerical Example 3

| UNIT: mm |
| --- |

| SURFACE DATA |
| --- |

| Surface No. | r | d | nd | vd |
| --- | --- | --- | --- | --- |
| 1 | 312.415 | 8.70 | 1.48749 | 70.2 |
| 2 | −526.366 | 0.20 |  |  |
| 3 | 118.507 | 18.93 | 1.43875 | 94.7 |
| 4 | −201.493 | 2.50 | 1.65160 | 58.5 |
| 5 | −602.827 | 0.30 |  |  |
| 6 | 73.388 | 15.98 | 1.43875 | 94.7 |
| 7 | −10876.935 | 2.50 | 1.48749 | 70.2 |
| 8 | 53.250 | 18.29 |  |  |
| 9 | −212.675 | 2.50 | 1.75500 | 52.3 |
| 10 | 175.750 | 9.73 |  |  |
| 11 | 109.348 | 9.83 | 1.43387 | 95.1 |
| 12 | −195.197 | 0.20 |  |  |
| 13 | 66.803 | 8.71 | 1.43387 | 95.1 |
| 14 | 584.388 | 2.08 |  |  |
| 15 | 299.691 | 3.03 | 1.75106 | 43.1 |
| 16 | ∞ | 2.00 | 1.83481 | 42.7 |
| 17 | 209.231 | (Variable) |  |  |
| 18 | 69.557 | 0.90 | 1.75106 | 43.1 |
| 19 | 17.145 | 4.60 |  |  |
| 20 | −52.263 | 4.75 | 1.67300 | 38.3 |
| 21 | −13.631 | 0.80 | 1.61800 | 63.3 |
| 22 | 42.549 | 0.46 |  |  |
| 23 | 25.692 | 3.72 | 1.61340 | 44.3 |
| 24 | −57.095 | 0.96 |  |  |
| 25 | −26.891 | 0.80 | 1.53775 | 74.7 |
| 26 | 170.641 | (Variable) |  |  |
| 27 | −36.081 | 0.80 | 1.71700 | 47.9 |
| 28 | 37.154 | 2.47 | 1.84666 | 23.8 |
| 29 | 211.066 | (Variable) |  |  |
| 30 (SP) | ∞ | 0.50 |  |  |
| 31 | 50.022 | 6.35 | 1.59522 | 67.7 |
| 32* | −62.652 | 0.10 |  |  |
| 33 | 135.459 | 4.56 | 1.43875 | 94.7 |
| 34 | −51.765 | 0.10 |  |  |

-continued

| UNIT: mm | | | | |
|---|---|---|---|---|
| 35 | 192.093 | 5.74 | 1.43875 | 94.7 |
| 36 | −28.092 | 0.90 | 1.80610 | 40.9 |
| 37 | 442.761 | 34.53 | | |
| 38 | 18.400 | 7.39 | 1.43875 | 94.7 |
| 39 | −126.750 | 3.40 | | |
| 40 | −200.583 | 0.80 | 1.65160 | 58.5 |
| 41 | 11.739 | 6.83 | 1.60342 | 38.0 |
| 42 | −39.211 | 1.39 | | |
| 43 | −24.344 | 0.80 | 1.95375 | 32.3 |
| 44 | 17.897 | 3.98 | 1.56732 | 42.8 |
| 45 | −57.962 | 0.10 | | |
| 46 | 49.408 | 1.03 | 1.54072 | 47.2 |
| 47 | 52.098 | 2.19 | 1.85920 | 33.0 |
| 48 | −404.430 | 5.00 | | |
| 49 | ∞ | 33.00 | 1.60859 | 46.4 |
| 50 | ∞ | 13.20 | 1.51680 | 64.2 |
| 51 | ∞ | 7.39 | | |
| Image Plane | ∞ | | | |

ASPHERIC DATA

32nd Surface

K = 0.00000e+00 A 4 = 1.77322e−06 A 6 = −3.26624e−10 A 8 = −3.11948e−12
A10 = 2.57352e−15

VARIOUS DATA
ZOOM RATIO 18.00

| | WIDE | MIDDLE | TELE |
|---|---|---|---|
| Focal length | 28.00 | 119.00 | 504.00 |
| Fno | 2.80 | 2.80 | 5.00 |
| Half Angle of View (°) | 11.11 | 2.65 | 0.63 |
| Image Height | 5.50 | 5.50 | 5.50 |
| Overall Lens Length | 339.03 | 339.03 | 339.03 |
| BF | 7.39 | 7.39 | 7.39 |
| d17 | 0.74 | 44.08 | 62.10 |
| d26 | 57.43 | 9.56 | 10.07 |
| d29 | 15.85 | 20.37 | 1.85 |
| d51 | 7.39 | 7.39 | 7.39 |

ZOOM LENS UNIT DATA

| Lens Unit | Starting Surface | Focal length |
|---|---|---|
| 1 | 1 | 152.40 |
| 2 | 18 | −21.17 |
| 3 | 27 | −48.81 |
| 4 | 30 | 39.31 |

Numerical Example 4

| UNIT: mm | | | | |
|---|---|---|---|---|
| SURFACE DATA | | | | |
| Surface No. | r | d | nd | vd |
| 1 | 158.379 | 7.68 | 1.48749 | 70.2 |
| 2 | 458.815 | 0.20 | | |
| 3 | 86.587 | 16.71 | 1.43387 | 95.1 |
| 4 | 1355.412 | 10.36 | | |
| 5 | 91.180 | 2.80 | 1.65160 | 58.5 |
| 6 | 55.979 | 14.88 | 1.43875 | 94.7 |
| 7 | 295.470 | 4.88 | | |
| 8 | −1256.109 | 2.50 | 1.75500 | 52.3 |
| 9 | 67.535 | 15.01 | | |
| 10 | 92.766 | 7.82 | 1.43387 | 95.1 |
| 11 | −1027.597 | 0.20 | | |
| 12 | 72.469 | 7.08 | 1.43387 | 95.1 |
| 13 | 379.015 | 2.61 | | |
| 14 | 256.634 | 2.50 | 1.65160 | 58.5 |

-continued

| UNIT: mm | | | | |
|---|---|---|---|---|
| 15 | 161.847 | (Variable) | | |
| 16 | 128.039 | 0.90 | 1.75106 | 43.1 |
| 17 | 18.527 | 4.24 | | |
| 18 | 715.190 | 6.11 | 1.67300 | 38.3 |
| 19 | −15.449 | 0.80 | 1.61800 | 63.3 |
| 20 | 32.797 | 0.47 | | |
| 21 | 21.236 | 3.83 | 1.61340 | 44.3 |
| 22 | 11750.378 | 1.47 | | |
| 23 | −36.384 | 0.80 | 1.53775 | 74.7 |
| 24 | 78.280 | (Variable) | | |
| 25 | −40.901 | 0.80 | 1.71700 | 47.9 |
| 26 | 37.675 | 2.22 | 1.84666 | 23.8 |
| 27 | 157.725 | (Variable) | | |
| 28 | 47.475 | 5.76 | 1.59522 | 67.7 |
| 29* | −63.719 | 0.10 | | |
| 30 | 3661.190 | 3.52 | 1.43875 | 94.7 |
| 31 | −48.534 | (Variable) | | |
| 32 (SP) | ∞ | 0.50 | | |
| 33 | 68.799 | 5.72 | 1.43875 | 94.7 |
| 34 | −27.340 | 0.90 | 1.80610 | 40.9 |
| 35 | 175.669 | 34.75 | | |
| 36 | 23.294 | 4.96 | 1.43875 | 94.7 |
| 37 | −112.299 | 0.48 | | |
| 38 | 317.277 | 0.80 | 1.65160 | 58.5 |
| 39 | 13.854 | 3.87 | 1.60342 | 38.0 |
| 40 | 32.788 | 10.45 | | |
| 41 | 79.696 | 0.80 | 1.95375 | 32.3 |
| 42 | 122.630 | 1.85 | 1.56732 | 42.8 |
| 43 | −179.894 | 0.21 | | |
| 44 | 68.195 | 3.68 | 1.54072 | 47.2 |
| 45 | −21.636 | 0.80 | 1.85920 | 33.0 |
| 46 | −193.010 | 5.00 | | |
| 47 | ∞ | 33.00 | 1.60859 | 46.4 |
| 48 | ∞ | 13.20 | 1.51680 | 64.2 |
| 49 | ∞ | 7.40 | | |
| Image Plane | ∞ | | | |

ASPHERIC DATA

29th Surface

K = 0.00000e+00 A 4 = 1.70742e−06 A 6 = −1.97490e−10 A 8 = −2.67824e−12
A10 = −5.56268e−16

VARIOUS DATA
ZOOM RATIO 18.00

| | WIDE | MIDDLE | TELE |
|---|---|---|---|
| Focal length | 28.00 | 119.00 | 504.00 |
| Fno | 2.80 | 2.80 | 5.00 |
| Half Angle of View (°) | 11.11 | 2.65 | 0.63 |
| Image Height | 5.50 | 5.50 | 5.50 |
| Overall Lens Length | 331.09 | 331.09 | 331.09 |
| BF | 7.40 | 7.40 | 7.40 |
| d15 | 1.37 | 45.03 | 62.79 |
| d24 | 55.93 | 7.96 | 10.14 |
| d27 | 18.15 | 22.57 | 0.96 |
| d31 | 1.02 | 0.91 | 2.59 |
| d49 | 7.40 | 7.40 | 7.40 |

ZOOM LENS UNIT DATA

| Lens Unit | Starting Surface | Focal length |
|---|---|---|
| 1 | 1 | 158.95 |
| 2 | 16 | −22.16 |
| 3 | 25 | −51.12 |
| 4 | 28 | 33.66 |
| 5 | 32 | 126.46 |

Numerical Example 5

| UNIT: mm | | | | |
|---|---|---|---|---|
| SURFACE DATA | | | | |
| Surface No. | r | d | nd | vd |
| 1 | 180.151 | 9.94 | 1.48749 | 70.2 |
| 2 | −2315.342 | 0.71 | | |
| 3 | 107.629 | 11.07 | 1.43387 | 95.1 |
| 4 | 419.299 | 25.70 | | |
| 5 | 113.127 | 3.00 | 1.64000 | 60.1 |
| 6 | 50.610 | 15.57 | 1.43875 | 94.7 |
| 7 | 705.891 | 3.96 | | |
| 8 | −248.400 | 3.00 | 1.83481 | 42.7 |
| 9 | 187.367 | 7.44 | | |
| 10 | 107.025 | 8.84 | 1.43387 | 95.1 |
| 11 | −204.748 | 0.71 | | |
| 12 | 70.689 | 5.99 | 1.43387 | 95.1 |
| 13 | 235.262 | 0.40 | | |
| 14 | 88.248 | 3.00 | 1.65160 | 58.5 |
| 15 | 63.869 | (Variable) | | |
| 16 | 85.901 | 1.30 | 1.43387 | 95.1 |
| 17 | 24.731 | 4.36 | | |
| 18 | 180.178 | 4.45 | 1.67300 | 38.3 |
| 19 | −42.438 | 1.30 | 1.61800 | 63.3 |
| 20 | 33.315 | (Variable) | | |
| 21 | 27.998 | 3.17 | 1.61340 | 44.3 |
| 22 | 75.135 | 2.07 | | |
| 23 | −70.565 | 1.20 | 1.72916 | 54.7 |
| 24 | 137.264 | (Variable) | | |
| 25 | −46.061 | 1.30 | 1.71700 | 47.9 |
| 26 | 43.113 | 3.38 | 1.84666 | 23.8 |
| 27 | 207.732 | (Variable) | | |
| 28 | 51.804 | 7.93 | 1.59522 | 67.7 |
| 29* | −98.805 | 0.10 | | |
| 30 | 60.130 | 7.22 | 1.43875 | 94.7 |
| 31 | −84.461 | 0.75 | | |
| 32 (SP) | ∞ | 0.50 | | |
| 33 | 118.777 | 6.77 | 1.43875 | 94.7 |
| 34 | −38.510 | 1.30 | 1.80610 | 40.9 |
| 35 | 97.121 | 25.02 | | |
| 36 | 20.564 | 7.63 | 1.48749 | 70.2 |
| 37 | −48.029 | 1.54 | | |
| 38 | −35.033 | 1.30 | 1.65160 | 58.5 |
| 39 | 22.058 | 6.22 | 1.50137 | 56.4 |
| 40 | −30.039 | 0.10 | | |
| 41 | −88.914 | 1.30 | 1.95375 | 32.3 |
| 42 | 15.670 | 8.83 | 1.56732 | 42.8 |
| 43 | −22.916 | 1.34 | | |
| 44 | −19.008 | 1.30 | 1.88300 | 40.8 |
| 45 | 21.340 | 5.69 | 1.84666 | 23.8 |
| 46 | −42.108 | 51.21 | | |
| Image Plane | ∞ | | | |

| ASPHERIC DATA | |
|---|---|
| 29th Surface | |

K = 0.00000e+00 A 4 = 1.39379e−06 A 6 = −9.24305e−11 A 8 = −1.97617e−13
A10 = 2.14074e−16

VARIOUS DATA
ZOOM RATIO 8.00

| | WIDE | MIDDLE | TELE |
|---|---|---|---|
| Focal length | 100.00 | 280.00 | 800.00 |
| Fno | 4.00 | 4.00 | 8.00 |
| Half Angle of View (°) | 8.42 | 3.03 | 1.06 |
| Image Height | 14.80 | 14.80 | 14.80 |
| Overall Lens Length | 330.10 | 330.10 | 330.10 |
| BF | 51.21 | 51.21 | 51.21 |

-continued

| UNIT: mm | | | |
|---|---|---|---|
| d15 | 1.81 | 28.03 | 38.60 |
| d20 | 9.37 | 7.40 | 1.10 |
| d24 | 18.01 | 3.11 | 31.74 |
| d27 | 43.01 | 33.66 | 0.76 |

| ZOOM LENS UNIT DATA | | |
|---|---|---|
| Lens Unit | Starting Surface | Focal length |
| 1 | 1 | 144.07 |
| 2 | 16 | −36.90 |
| 3 | 21 | −2476.47 |
| 4 | 25 | −59.74 |
| 5 | 28 | 38.28 |

Numerical Example 6

| UNIT: mm | | | |
|---|---|---|---|
| SURFACE DATA | | | |
| Surface No. | r | d | nd | vd |
|---|---|---|---|---|
| 1 | 179.668 | 12.39 | 1.48749 | 70.2 |
| 2 | −778.428 | 0.71 | | |
| 3 | 112.119 | 10.13 | 1.43387 | 95.1 |
| 4 | 309.328 | 29.71 | | |
| 5 | 116.822 | 3.00 | 1.64000 | 60.1 |
| 6 | 50.897 | 14.67 | 1.43875 | 94.7 |
| 7 | 750.315 | 5.85 | | |
| 8 | −184.621 | 3.00 | 1.83481 | 42.7 |
| 9 | 251.489 | 6.90 | | |
| 10 | 124.978 | 8.08 | 1.43387 | 95.1 |
| 11 | −173.443 | 0.71 | | |
| 12 | 65.734 | 7.25 | 1.43387 | 95.1 |
| 13 | 728.960 | 1.42 | | |
| 14 | 132.367 | 3.00 | 1.65160 | 58.5 |
| 15 | 66.176 | (Variable) | | |
| 16 | 81.760 | 1.30 | 1.43387 | 95.1 |
| 17 | 22.869 | 4.16 | | |
| 18 | 397.077 | 4.06 | 1.67300 | 38.3 |
| 19 | −35.825 | 1.30 | 1.61800 | 63.3 |
| 20 | 35.055 | (Variable) | | |
| 21 | 27.958 | 2.90 | 1.61340 | 44.3 |
| 22 | 83.901 | 1.81 | | |
| 23 | −59.221 | 1.20 | 1.72916 | 54.7 |
| 24 | 212.915 | (Variable) | | |
| 25 | −46.105 | 1.30 | 1.71700 | 47.9 |
| 26 | 41.071 | 3.31 | 1.84666 | 23.8 |
| 27 | 186.618 | (Variable) | | |
| 28 | 48.996 | 7.38 | 1.59522 | 67.7 |
| 29* | −123.195 | 0.10 | | |
| 30 | 112.882 | 6.10 | 1.43875 | 94.7 |
| 31 | −68.034 | 0.52 | | |
| 32 (SP) | ∞ | 0.50 | | |
| 33 | 71.787 | 7.82 | 1.43875 | 94.7 |
| 34 | −35.098 | 1.30 | 1.80610 | 40.9 |
| 35 | 157.780 | 24.56 | | |
| 36 | 20.806 | 7.72 | 1.48749 | 70.2 |
| 37 | −44.030 | 1.64 | | |
| 38 | −31.081 | 1.30 | 1.65160 | 58.5 |
| 39 | 27.129 | 5.99 | 1.50137 | 56.4 |
| 40 | −27.643 | 0.10 | | |

-continued

| UNIT: mm | | | | |
|---|---|---|---|---|
| 41 | −101.334 | 1.30 | 1.95375 | 32.3 |
| 42 | 15.069 | 8.82 | 1.56732 | 42.8 |
| 43 | −24.142 | 1.38 | | |
| 44 | −19.445 | 1.30 | 1.88300 | 40.8 |
| 45 | 19.433 | 5.85 | 1.84666 | 23.8 |
| 46 | −43.915 | 51.01 | | |
| Image Plane | ∞ | | | |

ASPHERIC DATA

29th Surface

K = 0.00000e+00 A 4 = 1.11472e−06 A 6 = −1.32082e−10 A 8 = −3.70035e−13
A10 = 5.52728e−16

VARIOUS DATA
ZOOM RATIO 8.00

| | WIDE | MIDDLE | TELE |
|---|---|---|---|
| Focal length | 100.00 | 280.00 | 800.00 |
| Fno | 4.00 | 4.00 | 8.00 |
| Half Angle of View (°) | 8.42 | 3.03 | 1.06 |
| Image Height | 14.80 | 14.80 | 14.80 |
| Overall Lens Length | 330.12 | 330.12 | 330.12 |
| BF | 51.01 | 51.01 | 51.01 |
| d15 | 1.68 | 28.96 | 40.86 |
| d20 | 7.73 | 5.72 | 0.92 |
| d24 | 20.31 | 1.85 | 24.76 |
| d27 | 37.57 | 30.76 | 0.75 |

ZOOM LENS UNIT DATA

| Lens Unit | Starting Surface | Focal length |
|---|---|---|
| 1 | 1 | 154.52 |
| 2 | 16 | −34.10 |
| 3 | 21 | 4289.03 |
| 4 | 25 | −58.66 |
| 5 | 28 | 36.47 |

TABLES 1 and 2 summarize various values in each example.

TABLE 1

| | | EX 1 | EX2 | EX3 | EX4 | EX5 | EX6 |
|---|---|---|---|---|---|---|---|
| (1) | (f1 + Ok1)/f1 | 0.56 | 0.55 | 0.57 | 0.56 | 0.53 | 0.50 |
| (2) | f1/f1b | 1.57 | 1.66 | 1.79 | 1.57 | 1.50 | 1.83 |
| (3) | \| f1/f1a \| | 0.13 | 0.02 | 0.09 | 0.11 | 0.26 | 0.27 |
| (4) | f1/f1c | −0.26 | −0.22 | −0.22 | −0.23 | −0.39 | −0.75 |
| (5) | L11/f1 | 0.58 | 0.69 | 0.69 | 0.60 | 0.69 | 0.69 |
| (6) | L1a/f1 | 0.38 | 0.46 | 0.46 | 0.38 | 0.51 | 0.51 |
| (7) | L1ab/f1 | 0.09 | 0.12 | 0.06 | 0.09 | 0.05 | 0.04 |
| (8) | f1/f2 | −7.7 | −7.5 | −7.2 | −7.2 | −3.9 | −4.5 |
| (9) | ν1ap − ν1an | 31.2 | 31.2 | 26.2 | 31.2 | 35.3 | 35.3 |
| (10). | f1/f1bc | 1.35 | 1.50 | 1.62 | 1.37 | 1.17 | 1.19 |

TABLE 2

| | EX 1 | EX 2 | EX 3 | EX 4 | EX 5 | EX 6 |
|---|---|---|---|---|---|---|
| f1 | 161.03 | 147.02 | 152.40 | 158.95 | 144.07 | 154.52 |
| Ok1 | −71.16 | −66.36 | −65.96 | −70.10 | −67.18 | −77.17 |
| f1a | 1252.49 | 5971.17 | −1743.34 | 1438.58 | 552.27 | 568.09 |
| f1b | 102.49 | 88.53 | 84.93 | 101.38 | 96.33 | 84.58 |
| f1c | −621.63 | −660.75 | −687.25 | −679.57 | −372.92 | −206.79 |
| L11 | 93.92 | 101.52 | 105.47 | 95.24 | 99.33 | 106.82 |
| L1a | 60.50 | 67.56 | 69.90 | 60.02 | 72.94 | 79.46 |
| L1ab | 14.84 | 17.58 | 9.73 | 15.01 | 7.44 | 6.90 |
| f2 | −21.01 | −19.65 | −21.17 | −22.16 | −36.90 | −34.10 |

TABLE 2-continued

| | EX 1 | EX 2 | EX 3 | EX 4 | EX 5 | EX 6 |
|---|---|---|---|---|---|---|
| ν1ap | 86.66 | 86.66 | 86.52 | 86.66 | 86.66 | 86.66 |
| ν1an | 55.43 | 55.43 | 60.36 | 55.43 | 51.41 | 51.41 |
| f1bc | 119.03 | 98.33 | 93.99 | 116.16 | 123.21 | 129.91 |

Image Pickup Apparatus

Figures 12A, 12B:
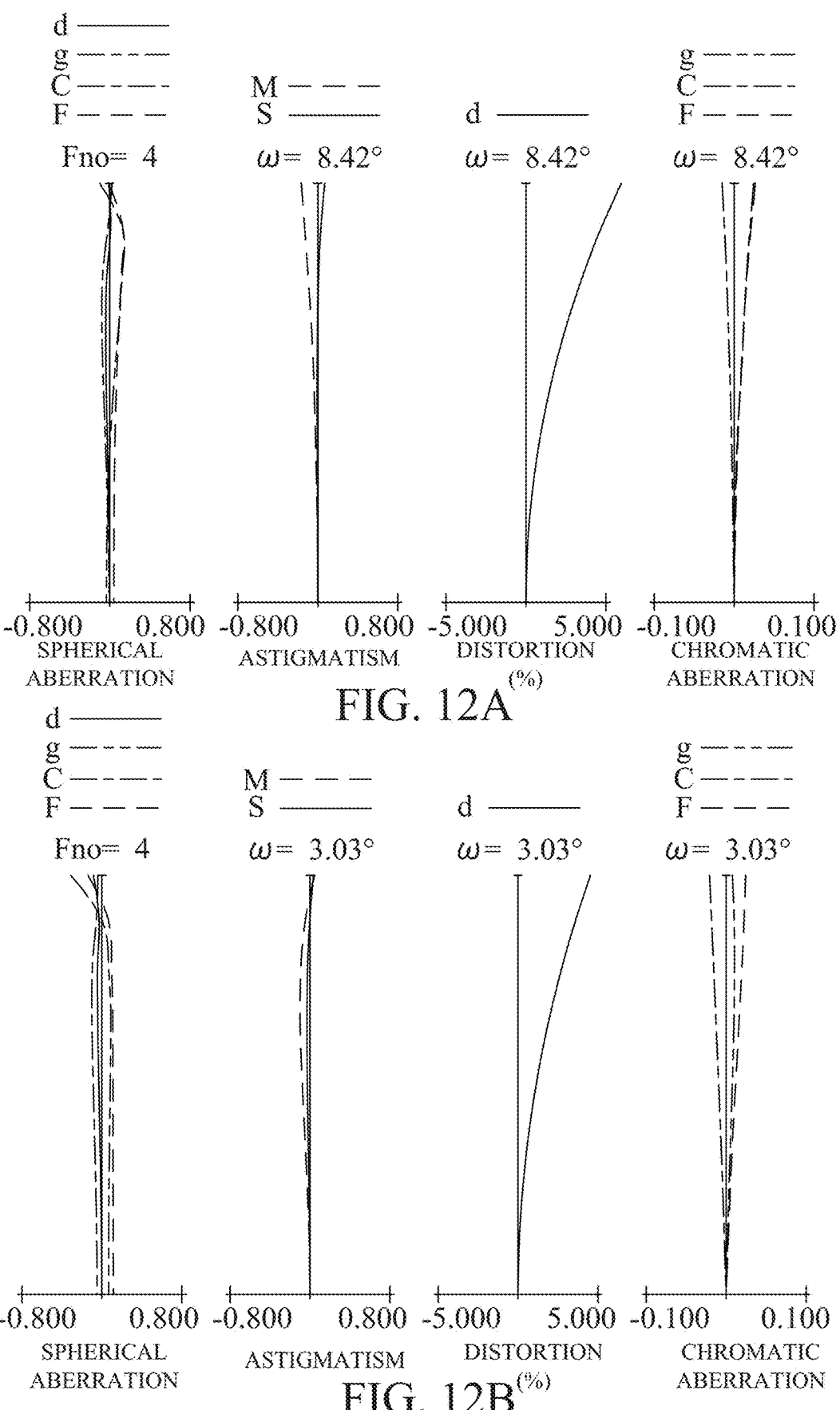
FIGS. 12A, 12B, and 12C are aberration diagrams of the zoom lens according to Example 6 in the in-focus state at infinity at the wide-angle end, an intermediate zoom position, and a telephoto end, respectively.
Figures 12C, 13:
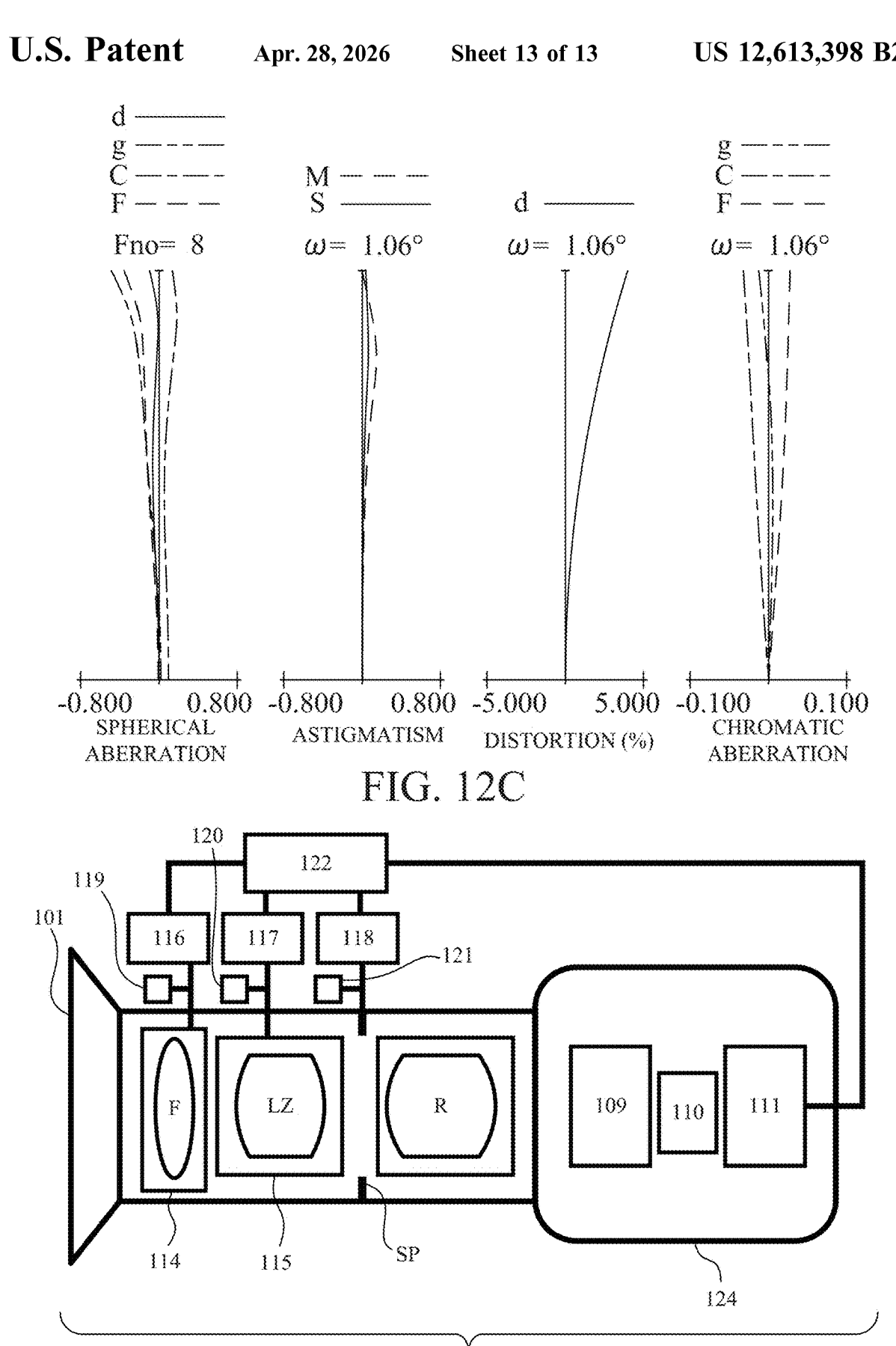
FIG. 13 illustrates an example of the configuration of the image pickup apparatus.

Referring now to FIG. 13, a description will be given of an example of a digital still camera (image pickup apparatus) using the zoom lens according to each example as an imaging optical system. FIG. 13 illustrates an example of the configuration of an image pickup apparatus. In FIG. 13, reference numeral 101 denotes the zoom lens according to any one of Examples 1 to 6. Reference numeral 124 denotes a camera (image pickup apparatus body). The zoom lens 101 is attachable to detachable from the camera 124. Reference numeral 125 denotes an image pickup apparatus configured by attaching the zoom lens 101 to the camera 124. The zoom lens 101 includes the first lens unit L1, the intermediate group LM including a plurality of lens units in which a distance between adjacent lens units changes during zooming, and the rear lens unit LR. In FIG. 13, the first lens unit L1 is illustrated as a lens unit F, a lens unit of the intermediate group LM that moves for zooming is illustrated as a lens unit LZ, and the rear lens unit LR is illustrated as a lens unit R. As described above, the first lens unit L1 includes a subunit that moves for focusing. In FIG. 13, SP denotes an aperture stop, and reference numerals 114 and 115 denote driving mechanisms including, for example, a helicoid, a cam, etc., for driving the subunit for focusing and the lens unit LZ for zooming, respectively. Reference numerals 116, 117, and 118 denote motors (actuators) configured to drive the driving mechanism 114, the driving mechanism 115, and the aperture stop SP, respectively. Reference numeral 119 denotes a detector configured to detect a subunit for focusing. Reference numeral 120 denotes a detector configured to detect the position of the lens unit LZ. Reference numeral 121 denotes a detector configured to detect the aperture diameter of the aperture stop SP. These detectors include, for example, encoders, potentiometers, photosensors, and the like. In the camera 124, reference numeral 109 denotes a glass block that includes, for example, an optical filter, and reference numeral 110 denotes an image sensor (photoelectric conversion element) configured to capture an object image formed by the zoom lens 101, and includes, for example, a CCD or CMOS device. Reference numerals 111 and 122 are processing units including a processor such as a CPU, which perform various processes and controls in the camera 124 and the zoom lens 101, respectively. The image pickup apparatus according to the present example can provide a useful image pickup apparatus that enjoys the beneficial effects of the zoom lens according to any of the examples.

Image Pickup System

An image pickup system (surveillance camera system) may include the zoom lens according to any one of the above examples and a control unit configured to control the zoom lens. In this case, the control unit is configured to control the zoom lens so that each lens unit moves as described above during zooming, focusing, and image stabilization. The control unit does not have to be integrated with the zoom lens, and may be separate from the zoom lens. For example, a control unit (control apparatus) disposed remotely from a driving unit configured to drive each lens in the zoom lens may include a transmission unit configured to transmit a control signal (command) for controlling the zoom lens. This control unit can remotely control the zoom lens.

By providing an operation unit such as a controller and buttons for remotely operating the zoom lens to the control unit, the zoom lens may be controlled according to the user's input to the operation unit. For example, the operation unit may include an enlargement button and a reduction button. A signal may be sent from the control unit to the driving unit of the zoom lens so that in a case where the user presses the enlargement button, the magnification of the zoom lens increases, and in a case where the user presses the reduction button, the magnification of the zoom lens decreases.

The image pickup system may include a display unit such as a liquid crystal panel configured to display information (moving state) about the zoom of the zoom lens. The information about the zoom of the zoom lens is, for example, the zoom magnification (zoom state) and a moving amount (moving state) of each lens unit. In this case, the user can remotely operate the zoom lens through the operation unit while viewing information about the zoom of the zoom lens displayed on the display unit. The display unit and the operation unit may be integrated by adopting a touch panel or the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a zoom lens that achieves a high zoom ratio and high optical performance with reduced size and weight and a lightweight focus driving unit.

This application claims the benefit of Japanese Patent Application No. 2022-206936, filed on Dec. 23, 2022, which is hereby incorporated by reference herein in its entirety.

What is claimed is:

1. A zoom lens comprising a plurality of lens units, the plurality of lens units consisting of, in order from an object side to an image side, a first lens unit having positive refractive power, an intermediate group including a plurality of lens units, and a rear lens unit, wherein a distance between adjacent lens units changes during zooming from a wide-angle end to a telephoto end, wherein the first lens unit is fixed relative to an image plane for zooming from the wide-angle end to the telephoto end, wherein the first lens unit consists of a plurality of subunits in which a distance between adjacent subunits changes during focusing, and the plurality of subunits include, in order from the object side to the image side, a first subunit that does not move for focusing, a second subunit having positive refractive power that moves for focusing, and a third subunit having negative refractive power, and wherein the following inequalities are satisfied:

$$0.10 < (f1 + Ok1)/f1 < 0.80$$

$$1.00 < f1/f1b < 2.00$$

where f1 is a focal length of the first lens unit in an in-focus state at infinity, Ok1 is a distance on an optical axis from a lens surface closest to an object of the first lens unit to an image-side principal point of the first lens unit in the in-focus state at infinity, and f1b is a focal length of the second subunit.

2. The zoom lens according to claim 1, wherein the following inequality is satisfied:

$$0.00 < |f1/f1a| < 0.30$$

where f1a is a focal length of the first subunit.

3. The zoom lens according to claim 1, wherein the following inequality is satisfied:

$$-1.00 < f1/f1c < -0.10$$

where f1c is a focal length of the third subunit.

4. The zoom lens according to claim 1, wherein the following inequality is satisfied:

$$0.40 < L11/f1 < 0.90$$

where L11 is a distance on the optical axis from the lens surface closest to the object of the first lens unit to a lens surface closest to the image plane of the first lens unit in the in-focus state at infinity.

5. The zoom lens according to claim 1, wherein the following inequality is satisfied:

$$0.20 < L1a/f1 < 0.70$$

where L1a is a distance on the optical axis from a lens surface closest to the object of the first subunit to a lens surface closest to the image side of the first subunit.

6. The zoom lens according to claim 1, wherein the following inequality is satisfied:

$$0.01 < L1ab/f1 < 0.20$$

where L1ab is a distance on the optical axis from a lens surface closest to the image side of the first subunit to a lens surface closest to the object side of the second subunit in the in-focus state at infinity.

7. The zoom lens according to claim 1, wherein the following inequality is satisfied:

$$-12.0 < f1/f2 < -2.0$$

where f2 is a focal length of a second lens unit located closest to the object in the intermediate group.

8. The zoom lens according to claim 1, wherein the following inequality is satisfied:

$$20.0 < v1ap - v1an < 40.0$$

where v1ap is an average value of Abbe numbers based on d-line of all positive lens materials included in the first subunit, and v1an is an average value of Abbe numbers based on the d-line of all negative lens materials included in the first subunit.

9. The zoom lens according to claim 1, wherein the following inequality is satisfied:

$$1.0 < f1/f1bc < 2.0$$

where f1bc is a combined focal length of the second subunit and the third subunit in the in-focus state at infinity.

10. The zoom lens according to claim 1, wherein the first lens unit consists of, in order from the object side to the image side, the first subunit, the second subunit, and the third subunit.

11. The zoom lens according to claim 10, wherein the third subunit does not move for focusing.

12. The zoom lens according to claim 10, wherein the third subunit moves for focusing.

13. The zoom lens according to claim 1, wherein each of the plurality of lens units in the intermediate group is movable.

14. An image pickup apparatus comprising:
a zoom lens; and
an image sensor configured to capture an image formed by the zoom lens, wherein the zoom lens includes a plurality of lens units, the plurality of lens units consisting of, in order from an object side to an image side, a first lens unit having positive refractive power, an intermediate group including a plurality of lens units, and a rear lens unit, wherein a distance between adjacent lens units changes during zooming from a wide-angle end to a telephoto end, wherein the first lens unit is fixed relative to an image plane for zooming from the wide-angle end to the telephoto end, wherein the first lens unit consists of a plurality of subunits in which a distance between adjacent subunits changes during focusing, and the plurality of subunits include, in order from the object side to the image side, a first subunit that does not move for focusing, a second subunit having positive refractive power that moves for focusing, and a third subunit having negative refractive power, and wherein the following inequalities are satisfied:

$$0.10 < (f1 + Ok1)/f1 < 0.80$$

$$1.00 < f1/f1b < 2.00$$

where f1 is a focal length of the first lens unit in an in-focus state at infinity, Ok1 is a distance on an optical axis from a lens surface closest to an object of the first lens unit to an image-side principal point of the first lens unit in the in-focus state at infinity, and f1b is a focal length of the second subunit.

15. An image pickup system comprising:
a zoom lens; and
a control unit configured to control the zoom lens during zooming, wherein the zoom lens includes a plurality of lens unit, the plurality of lens units consisting of, in order from an object side to an image side, a first lens unit having positive refractive power, an intermediate group including a plurality of lens units, and a rear lens unit, wherein a distance between adjacent lens units changes during zooming from a wide-angle end to a telephoto end, wherein the first lens unit is fixed relative to an image plane for zooming from the wide-angle end to the telephoto end, wherein the first lens unit consists of a plurality of subunits in which a distance between adjacent subunits changes during focusing, and the plurality of subunits include, in order from the object side to the image side, a first subunit that does not move for focusing, a second subunit having positive refractive power that moves for focusing, and a third subunit having negative refractive power, and wherein the following inequalities are satisfied:

$$0.10 < (f1 + Ok1)/f1 < 0.80$$

$$1.00 < f1/f1b < 2.00$$

where f1 is a focal length of the first lens unit in an in-focus state at infinity, Ok1 is a distance on an optical axis from a lens surface closest to an object of the first lens unit to an image-side principal point of the first lens unit in the in-focus state at infinity, and f1b is a focal length of the second subunit.

16. The image pickup system according to claim 15, wherein the control unit is configured separately from the zoom lens, and includes a transmission unit configured to transmit a control signal for controlling the zoom lens.

17. The image pickup system according to claim 15, wherein the control unit is configured separately from the zoom lens, and includes an operation unit configured to operate the zoom lens.

18. The image pickup system according to claim 15, further comprising a display unit configured to display information about zoom of the zoom lens.

\* \* \* \* \*